United States Patent [19]
Stanchus et al.

[11] Patent Number: 5,907,734
[45] Date of Patent: May 25, 1999

[54] ACTIVE LIGHT LOCK COUPLED RESTRAINT AND CAMERA

[75] Inventors: Robert J. Stanchus; Anthony DiRisio, both of Rochester; Robert L. Kuhn, Jr., Rush; Michael L. Wirt, Avon, all of N.Y.

[73] Assignee: Eastman Kodak Company, Rochester, N.Y.

[21] Appl. No.: 08/994,860

[22] Filed: Dec. 19, 1997

[51] Int. Cl.$^6$ .................................................. G03B 17/26
[52] U.S. Cl. ..................... 396/513; 396/536; 396/538; 396/543
[58] Field of Search ................................... 396/512, 513, 396/515, 516, 518, 535, 536, 538, 543

[56] References Cited

U.S. PATENT DOCUMENTS

| | | |
|---|---|---|
| 1,389,164 | 8/1921 | Roikjer . |
| 2,771,825 | 11/1956 | Naumann . |
| 3,259,410 | 7/1966 | Neudecker et al. . |
| 3,938,170 | 2/1976 | Winkler et al. . |
| 4,149,793 | 4/1979 | Date . |
| 4,202,614 | 5/1980 | Harvey . |
| 4,214,830 | 7/1980 | Schroder . |
| 4,679,926 | 7/1987 | Suzuki et al. . |
| 4,714,938 | 12/1987 | Kazami et al. . |
| 5,023,640 | 6/1991 | Diehl . |
| 5,155,514 | 10/1992 | Tamamura . |
| 5,159,365 | 10/1992 | Takahashi et al. . |
| 5,231,438 | 7/1993 | Smart . |
| 5,307,099 | 4/1994 | Kawamura et al. . |
| 5,319,406 | 6/1994 | Takatori . |
| 5,321,455 | 6/1994 | Cocca . |
| 5,323,201 | 6/1994 | Richiuso et al. . |
| 5,357,303 | 10/1994 | Wirt . |
| 5,359,378 | 10/1994 | Zander et al. . |
| 5,363,166 | 11/1994 | Takahashi et al. . |
| 5,452,036 | 9/1995 | Kamata . |
| 5,477,295 | 12/1995 | Lawther et al. . |
| 5,481,325 | 1/1996 | Wada et al. . |
| 5,495,310 | 2/1996 | Takatori . |
| 5,497,212 | 3/1996 | Kawamura et al. . |
| 5,500,705 | 3/1996 | Stephenson, III . |
| 5,530,504 | 6/1996 | Fuss et al. . |
| 5,530,508 | 6/1996 | Fuss et al. . |
| 5,530,509 | 6/1996 | Kuhn, Jr. et al. . |
| 5,555,057 | 9/1996 | DiRisio . |
| 5,555,063 | 9/1996 | Balling . |
| 5,563,672 | 10/1996 | Fuss et al. . |
| 5,565,951 | 10/1996 | Tokui . |

(List continued on next page.)

FOREIGN PATENT DOCUMENTS

| | | |
|---|---|---|
| 0 751 418 A1 | 2/1997 | European Pat. Off. . |
| 5-5046732 | 2/1980 | Japan . |
| 1-191836 | 8/1989 | Japan . |
| 5-150344 | 6/1993 | Japan . |
| 5-150345 | 6/1993 | Japan . |

*Primary Examiner*—Eddie C. Lee
*Attorney, Agent, or Firm*—Robert Luke Walker

[57] ABSTRACT

A film door restraint and camera used with a film door having a tappet movable between latched and unlatched positions, a film cartridge having a filmstrip and an active light lock movable between open and closed states, and a cartridge spool driver movable in first and second directions of rotation to rotate a spool of said cartridge. The film door restraint has a toggle, a rotational member, and a follower. The toggle is coupled to the active light lock and is capable of tripping between an open position, in which the active light lock is open, and a closed position, in which the active light lock is closed. The toggle is tripped by the tappet when the toggle is in the open position and the tappet is moved from the latched position to the unlatched position. The rotational member is joined to the spool driver for rotation with the spool driver. The rotational member defines primary and secondary guideways. The follower has first and second ends and is disposed to travel along the guideways during the rotation of the rotational member. The second end traps the toggle in the open position when the first end is disposed in the primary guideway. The second end frees the toggle to trip when the first end is disposed in the secondary guideway.

24 Claims, 27 Drawing Sheets

U.S. PATENT DOCUMENTS

| | | |
|---|---|---|
| 5,583,598 | 12/1996 | Kobayashi . |
| 5,592,253 | 1/1997 | Nishimura et al. . |
| 5,600,393 | 2/1997 | Funahashi . |
| 5,602,609 | 2/1997 | Balling . |
| 5,602,611 | 2/1997 | Takatori et al. . |
| 5,612,760 | 3/1997 | Okuno . |
| 5,617,169 | 4/1997 | Takaba et al. . |
| 5,619,298 | 4/1997 | Stiehler . |
| 5,630,192 | 5/1997 | Kobayashi . |
| 5,638,152 | 6/1997 | Stephenson, III et al. . |
| 5,689,733 | 11/1997 | Zawodny et al. . |

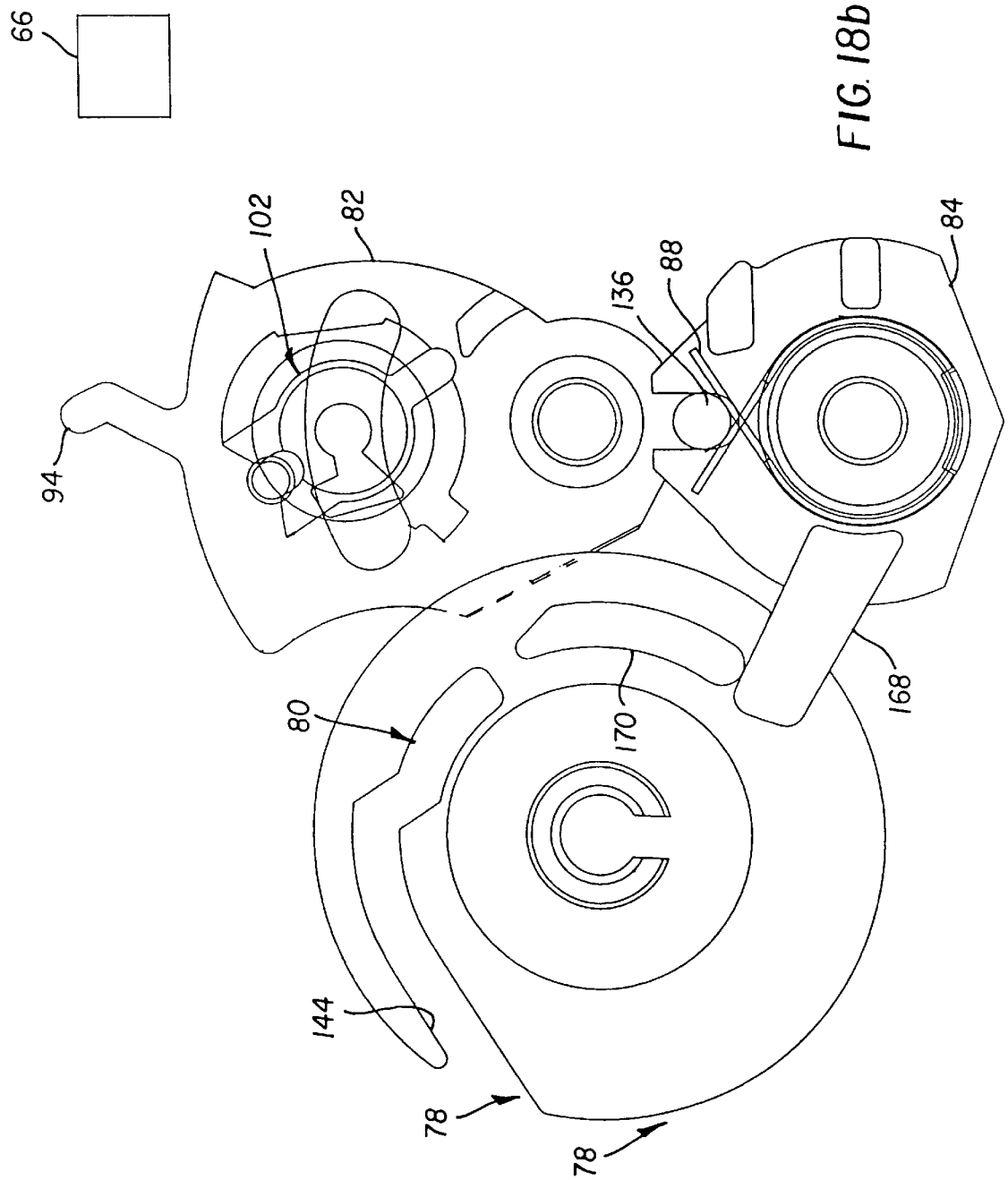

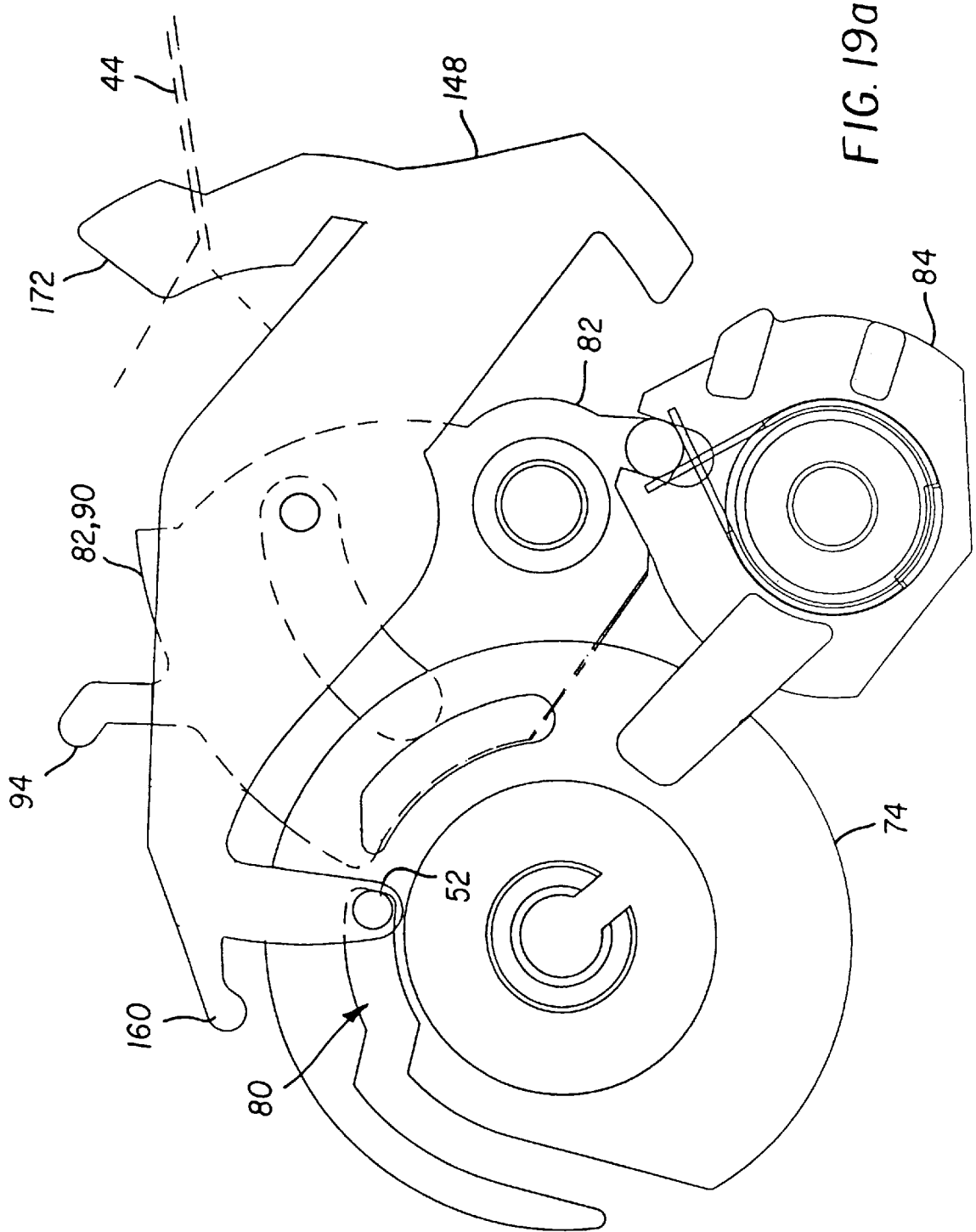

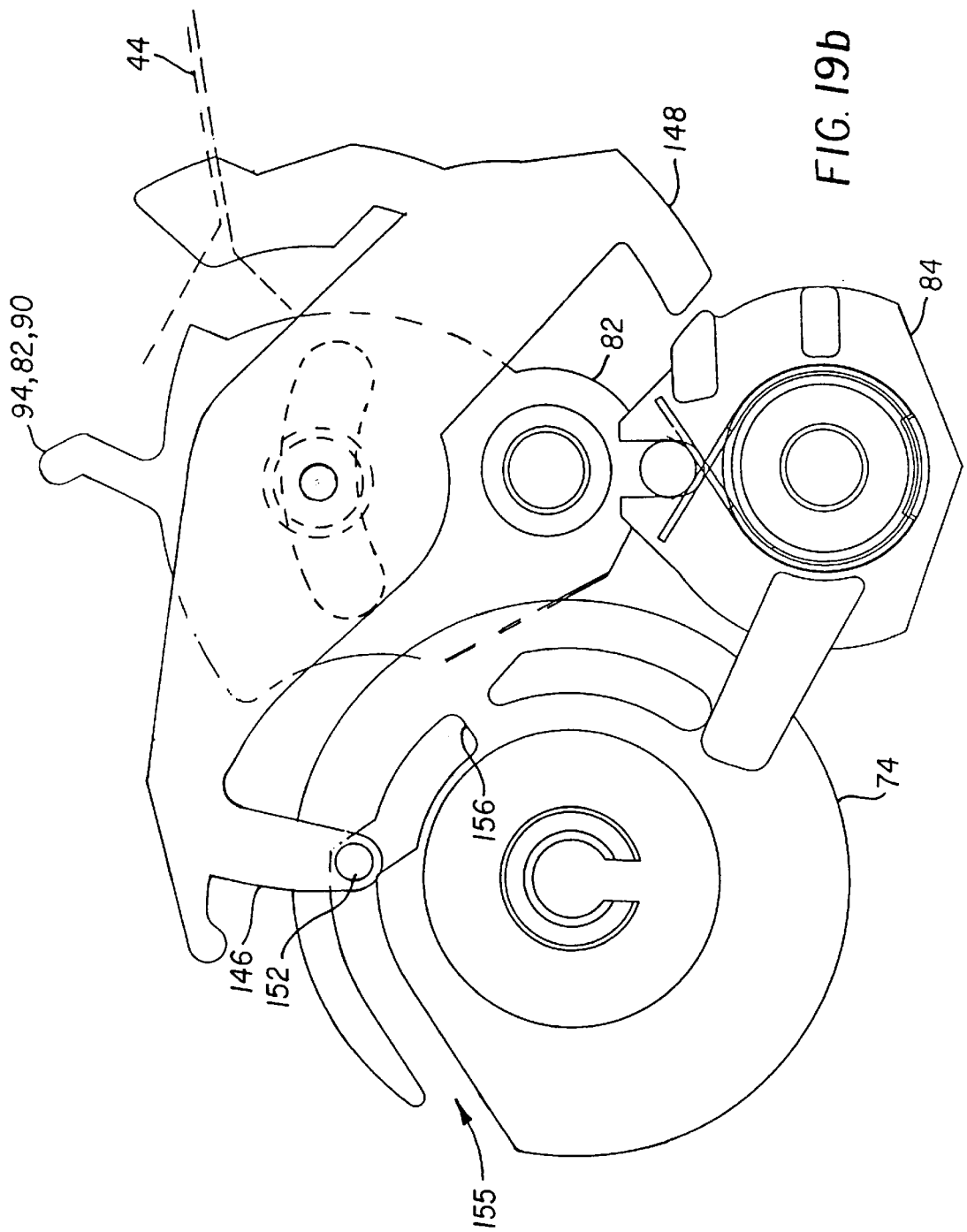

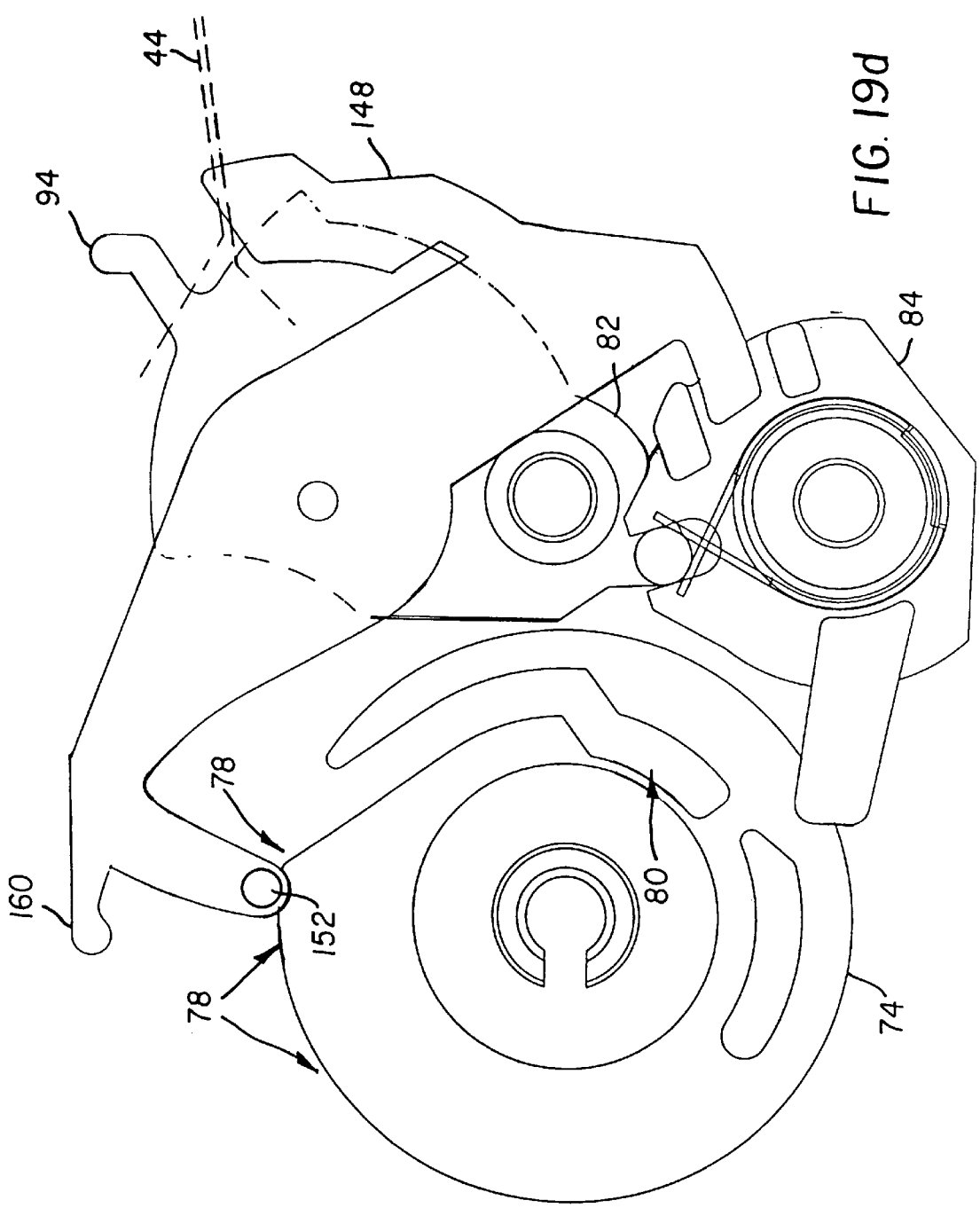

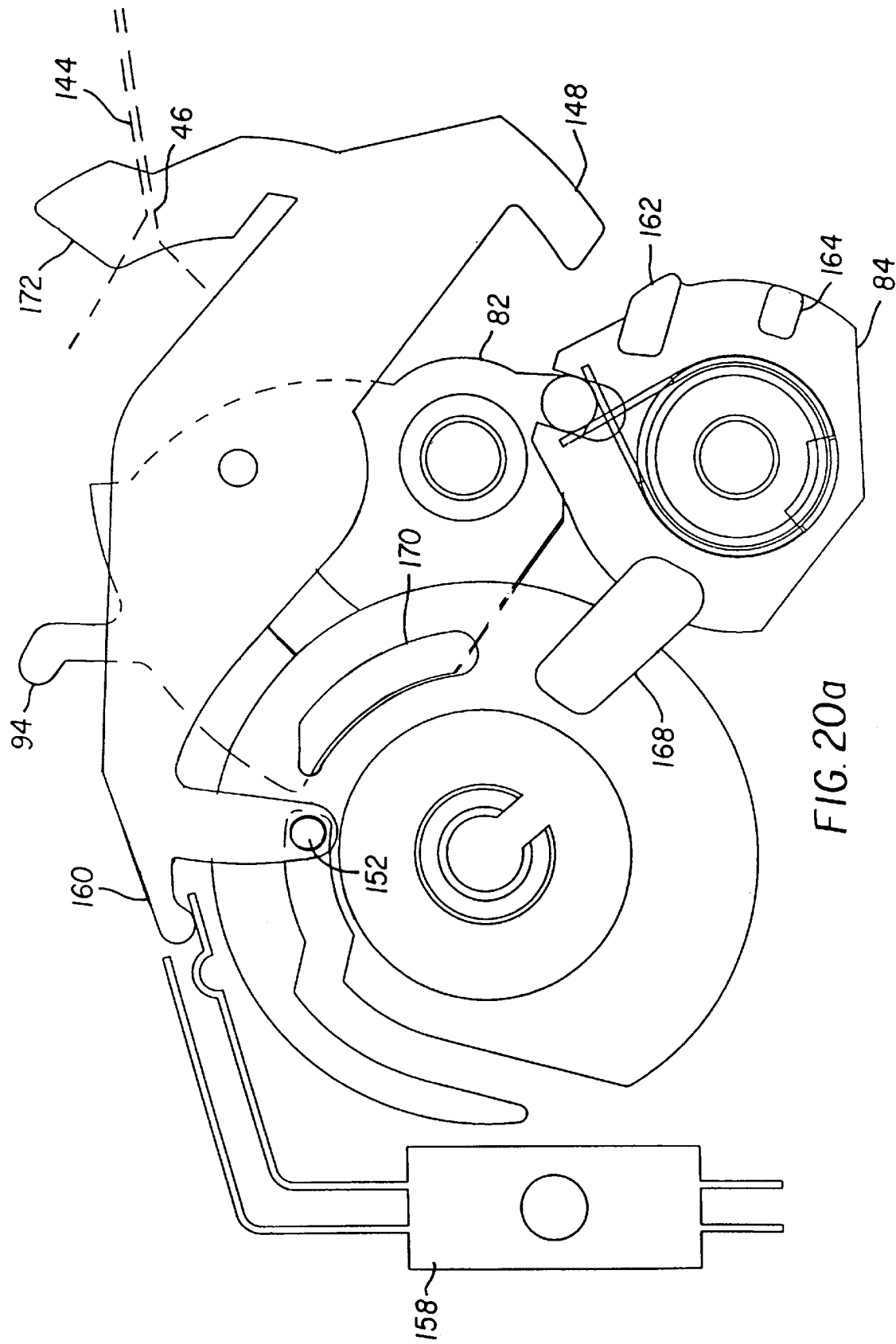

ACTIVE LIGHT LOCK COUPLED RESTRAINT AND CAMERA

CROSS REFERENCE TO RELATED APPLICATIONS

Reference is made to commonly assigned applications Ser. No. 08/565,463, filed Nov. 30, 1995, now U.S. Pat. No. 5,737,659; Ser. No. 08/568,110, filed Dec. 6, 1995, now U.S. Pat. No. 5,717,971; and Ser. No. 08/568,214, filed Dec. 6, 1995, now U.S. Pat. No. 5,713,057; all of which are assigned to the assignee of this application.

FIELD OF THE INVENTION

The invention relates to photographic equipment suitable for use with film cartridges having an active light lock and more particularly relates to an active light lock coupled restraint and camera incorporating the restraint.

BACKGROUND OF THE INVENTION

Many cameras and other film handling devices now use thrust cartridges having active light locks, sometimes called "light valves", rather than the plush light traps used in conventional cartridges. Advanced Photo System™ (APS™) cameras and devices use this type of cartridge. Such film cartridges include a coiled filmstrip within an canister having a longitudinally extending opening for exit of the filmstrip from the cartridge. A filmstrip is wound around a cartridge spool that is rotatably positioned within the canister. The active light lock is a hatch that is mounted adjacent the cartridge opening and is movable between an open state, in which the filmstrip can be moved into and out of the cartridge; and a closed state, in which the cartridge is light-tightly sealed.

Unlike conventional film cartridges (such as "35 mm", that is, Type 135 film cartridges) thrust film cartridges have no film leader extending out of the cartridge to indicate that the film is unexposed. Consequently, some other means is required to indicate whether unexposed frames exist on the film contained within the film cartridge. One such means, used in APS cartridges, is one or more visual indicator visible from the exterior of a film cartridge. One type of visible indicator is in the form of icons. The film spool can be rotated to align the visual indicator with icons on the exterior of the film cartridge, for example, specially formed icon openings to designate the film as being: unexposed, partially exposed, fully exposed, or processed. Another visible indicator is a radial bar code disposed on a data disk positioned at an axial end of the film cartridge. The data disk is rotatable with the rotation of the film spool contained within the film cartridge during film advancement and rewind. The radial bar code is typically read by the use of an optical sensor disposed adjacent to the radial bar code. Generally, operations involving the film spool and/or film cartridge, including for example, positioning the film spool to align a visual indicator or indicators, are referred to as "parking" the film spool. Typically, the film spool is parked after the film has been completely rewound into the film cartridge.

The door release of a camera typically opens a latch or otherwise allows a chamber door to open so that a film cartridge can be loaded or unloaded from the camera. Cameras can have several different operations, such as camera initialization, that occur after closing of the chamber door. After a thrust film cartridge has been loaded into a camera and the film door is closed, the camera needs to open the active light lock before film can be thrust from the film cartridge. When the user decides to rewind the film and eject the film cartridge, the camera must close the light lock door prior to opening the film door.

Locking mechanisms are known which prevent the opening a camera's film door when film is extended from a film cartridge. Many of these mechanisms lock or unlock the film door responsive to the presence or absence of a filmstrip in part of the film path of the camera. These mechanisms are practical for conventional film cartridges; but are risky for thrust cartridges, since the active light lock can be open even when all the film is wound into the canister. Thus, a user could possibly open the film door and extract the film cartridge before the film spool is parked, resulting in wasted film.

Various locking mechanisms are known for use with thrust film cartridges. Some mechanisms use the optical sensor and radial bar code for parking the film spool. These mechanisms have the shortcoming that in certain circumstances, the film spool may be improperly parked. This can result from many different factors, including optical sensor failure and/or misalignment of the radial bar code to the optical sensor. In the circumstance of an improperly parked film spool, a locking mechanism, which prevents the opening of a film door until the film spool is properly parked, would block the release of the film door and the photographic system user would be prevented from gaining access to the film cartridge.

It would thus be desirable to provide an active light lock coupled film door restraint and camera in which the spool of a thrust cartridge is mechanically parked and the film door is locked and unlocked mechanically, in coordination with spool parking.

SUMMARY OF THE INVENTION

The invention is defined by the claims. The invention, in its broader aspects, provides a film door restraint and camera used with a film door having a tappet movable between latched and unlatched positions, a film cartridge having a filmstrip and an active light lock movable between open and closed states, and a cartridge spool driver movable in first and second directions of rotation to rotate a spool of said cartridge. The film door restraint has a toggle, a rotational member, and a follower. The toggle is coupled to the active light lock and is capable of tripping between an open position, in which the active light lock is open, and a closed position, in which the active light lock is closed. The toggle is tripped by the tappet when the toggle is in the open position and the tappet is moved from the latched position to the unlatched position. The rotational member is joined to the spool driver for rotation with the spool driver. The rotational member defines primary and secondary guideways. The follower has first and second ends and is disposed to travel along the guideways during the rotation of the rotational member. The second end traps the toggle in the open position when the first end is disposed in the primary guideway. The second end frees the toggle to trip when the first end is disposed in the secondary guideway.

It is an advantageous effect of at least some of the embodiments of the invention that an active light lock coupled film door restraint and camera are provided in which the spool of a thrust cartridge is mechanically parked and the film door is locked and unlocked mechanically, in coordination with spool parking.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 18b is the same view as FIG. 18, but the toggle is shown in an intermediate position. The lug of the rotational member is engaging the lever arm of the throw. The location of the tappet, in the unlatched position, is indicated by a box.

FIGS. 19a–19d are each a simplified bottom perspective view of the toggle, rotational member, and follower of the camera of FIG. 1. The location of overlapped portions of the sector and guideways are indicated by dashed lines as is the location of the film gate. The sequence of FIGS. 19a–19d illustrates rotation of the rotational member in the first direction of rotation; starting, in FIG. 19a, with the first end of the follower in the secondary guideway and the toggle is in the closed position; and ending, in FIG. 19d, with the first end of the follower in the primary guideway and the toggle in the open position.

FIGS. 20a–20f are each a simplified bottom perspective view of the toggle, rotational member, follower, and motor kill switch of the camera of FIG. 1. The location of overlapped portions of the sector and guideways are indicated by dashed lines as is the location of the film gate. The sequence of FIGS. 20a–20f illustrates the actuation and deactuation of the motor kill switch.

DETAILED DESCRIPTION OF THE INVENTION

Figure 1:
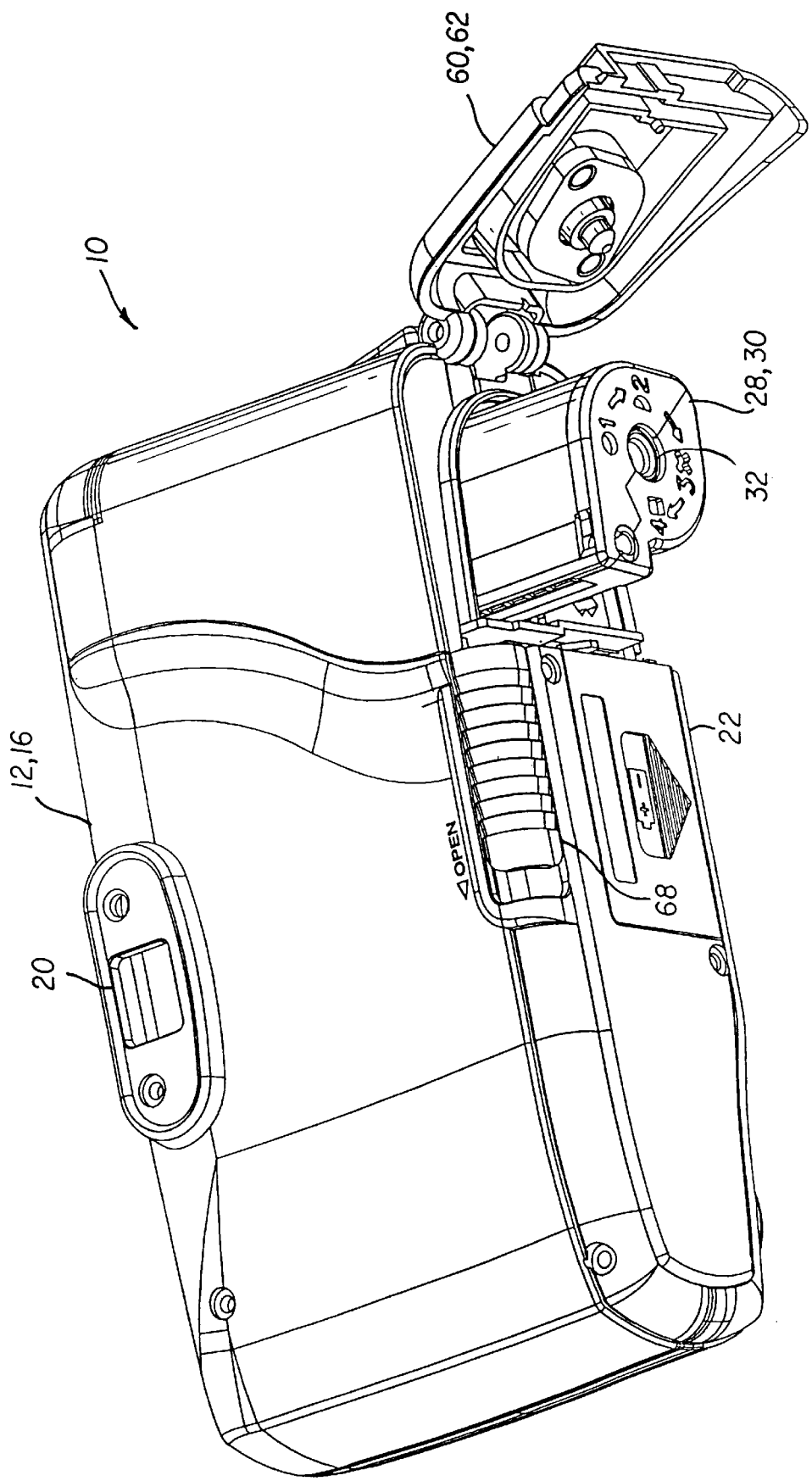
FIG. 1 is a bottom, rear perspective view of an embodiment of the camera of the invention and a film cartridge.
Figure 2:
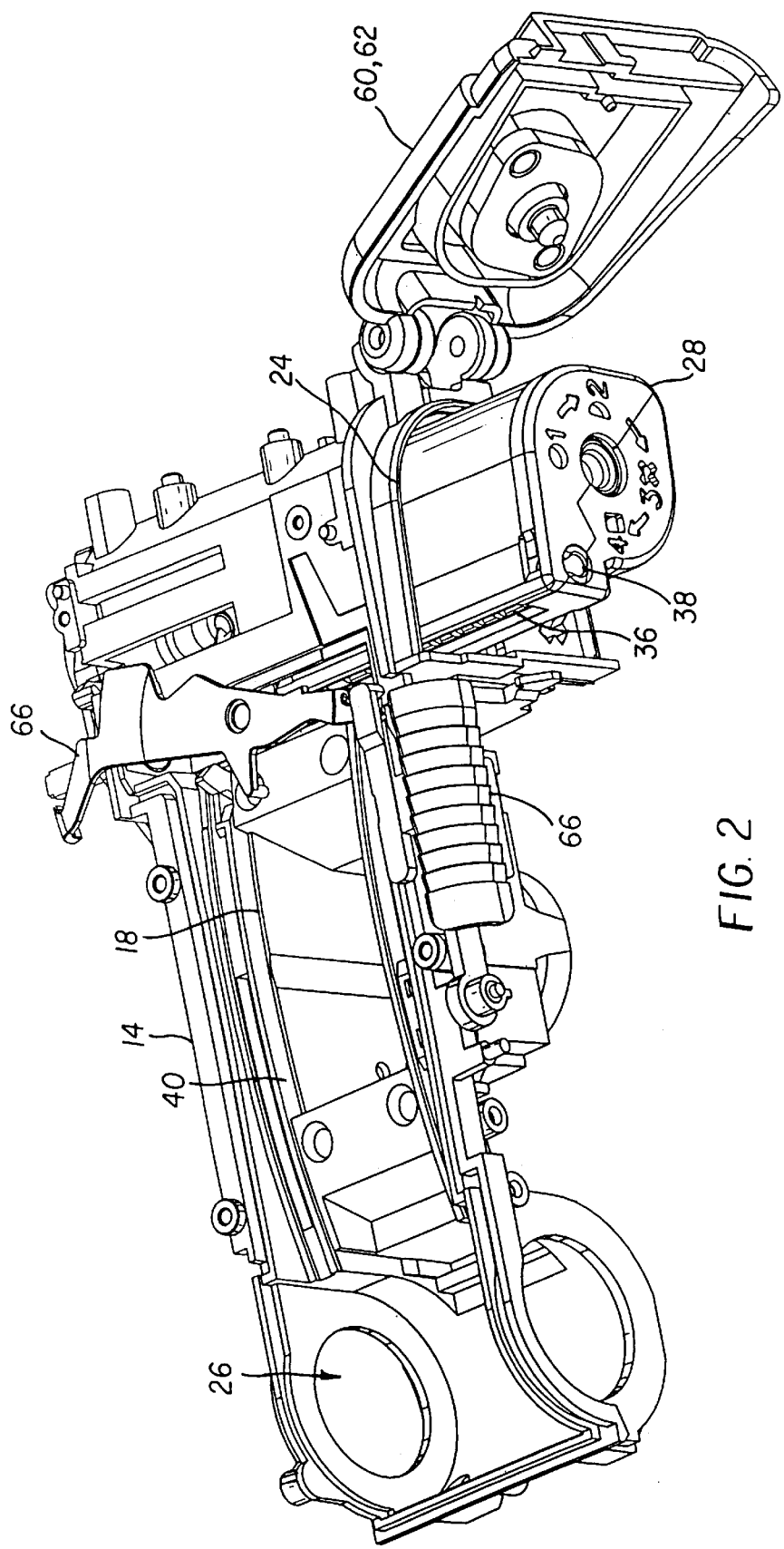
FIG. 2 is substantially the same view as FIG. 1, except that the body shell and camera components of secondary concern in the invention are removed for clarity.
Figure 3:
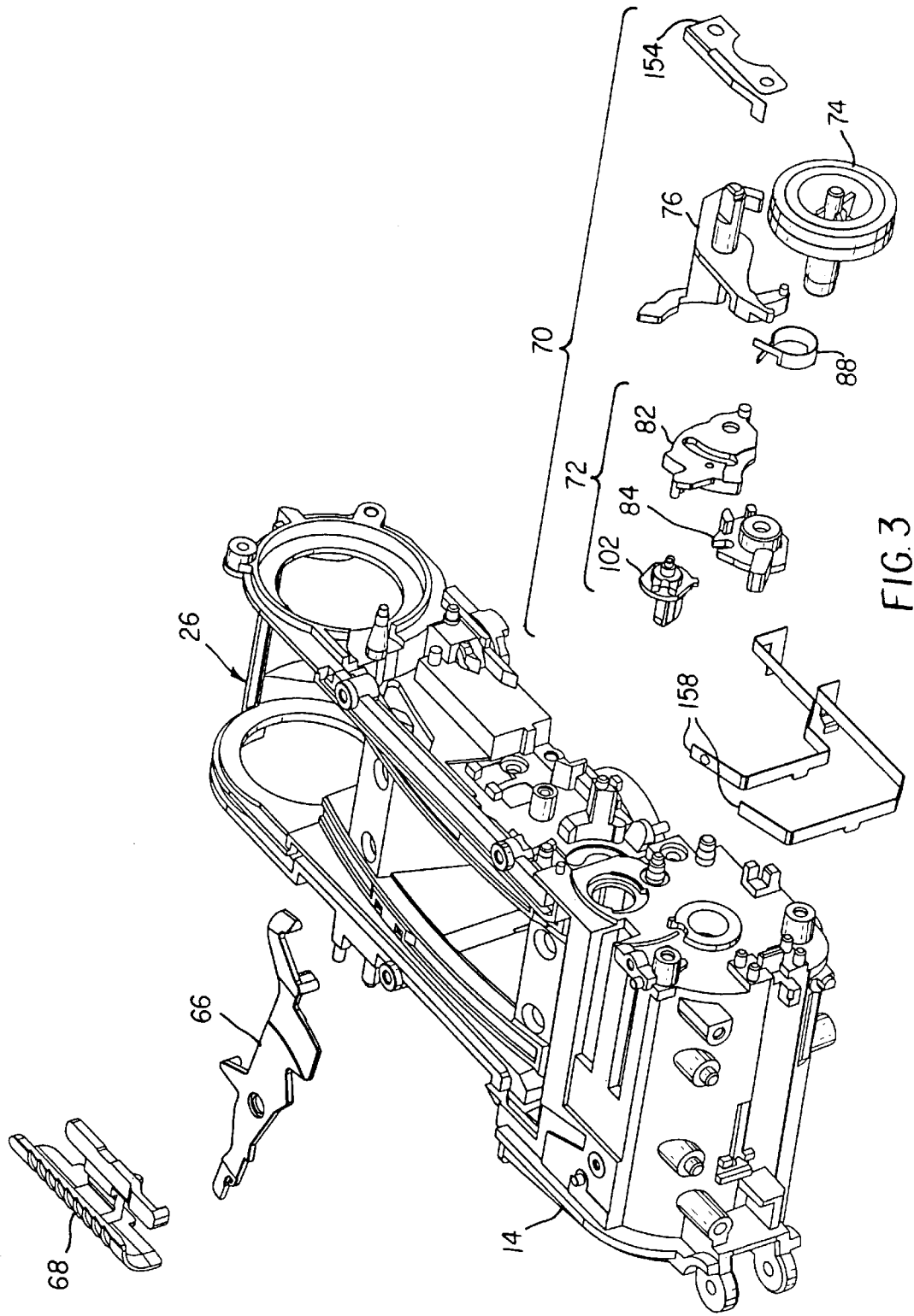
FIG. 3 is an exploded top, rear perspective view of the camera components illustrated in FIG. 2, with the exception of the film door. The film cartridge is also not shown.
Figure 4:
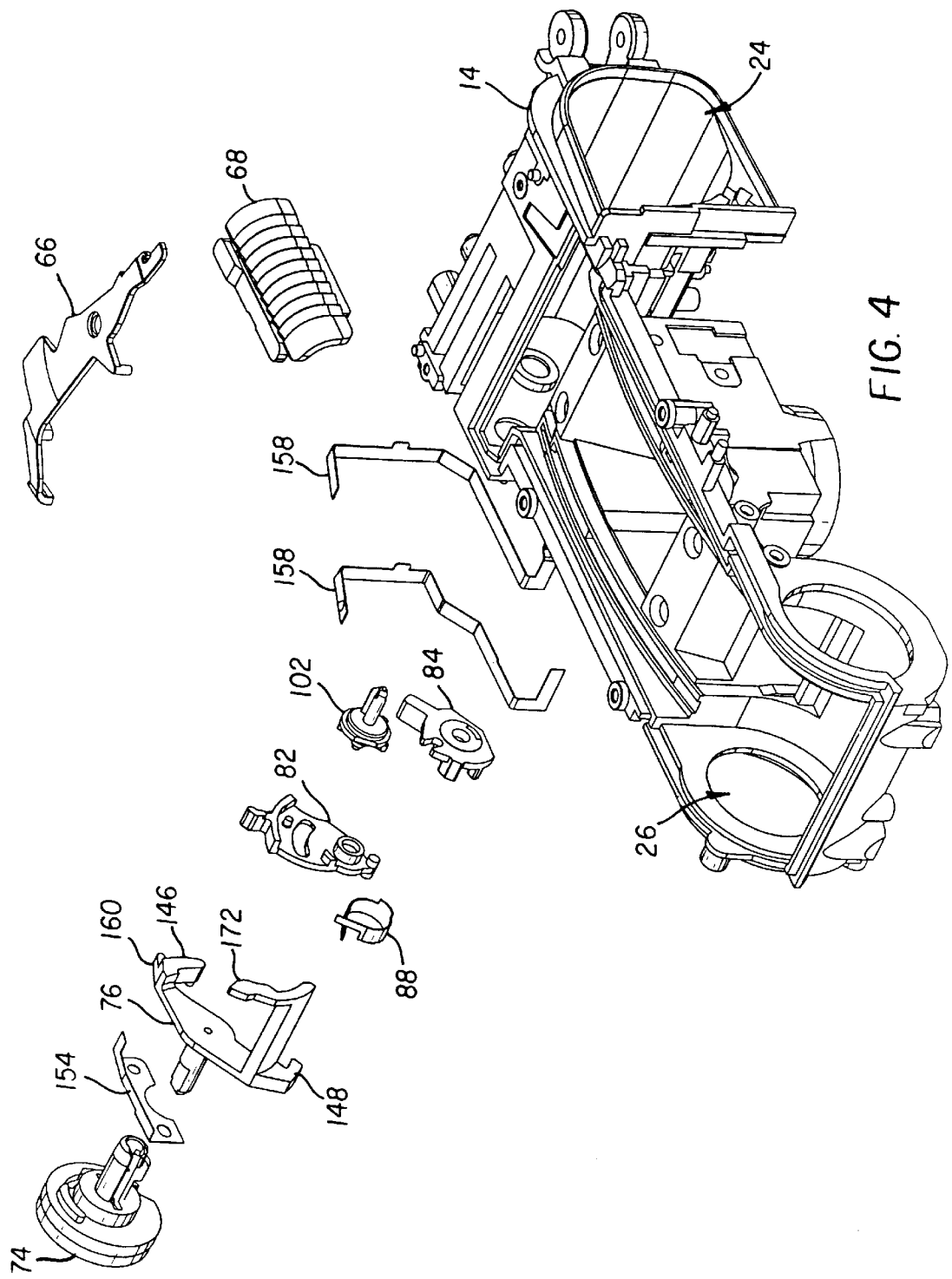
FIG. 4 is an exploded bottom, rear perspective view of the same camera components as in FIG. 3.

The camera 10 of the invention has a body 12 including a frame 14 and a shell 16 enclosing the frame 14. An exposure system 18, illustrated by a baffle in FIG. 2, is mounted in the body 12. The exposure system 18 also includes lens, shutter, and metering systems (not separately illustrated). Such features of exposures systems and other conventional camera components, such as the viewfinder 20 and battery compartment door 22 shown in FIG. 1, are suitable for use in the improved camera 10 and are well known to those of skill in the art.

Inside the body 12 is a film cartridge chamber 24 and a take-up chamber 26. The film cartridge chamber 24 is configured to accept a thrust film cartridge 28 such as the APS cartridge shown in FIG. 1. The film cartridge 28 has a canister 30, a spool 32 within the canister 30, and a filmstrip 34 that is rolled on the spool 32 within the canister 30. The film cartridge 28 also has an active light lock 36 positioned to close the thrust cartridge 28. The active light lock 36 has a shank 38 accessible through a port in the canister 30. The shank 38 can be rotated to move the active light lock 36 between an open state and a closed state.

Between the film chambers 24,26 is an intermediate section 40. The film chambers 24,26, intermediate section 40, and film cartridge 28 together define a film path 42. The film path 42 includes an exposure frame 44 at which regions of the filmstrip 34 are sequentially exposed and a film gate 46 where the edge of the exposure frame 44 meets the film cartridge chamber 24.

Figure 11:
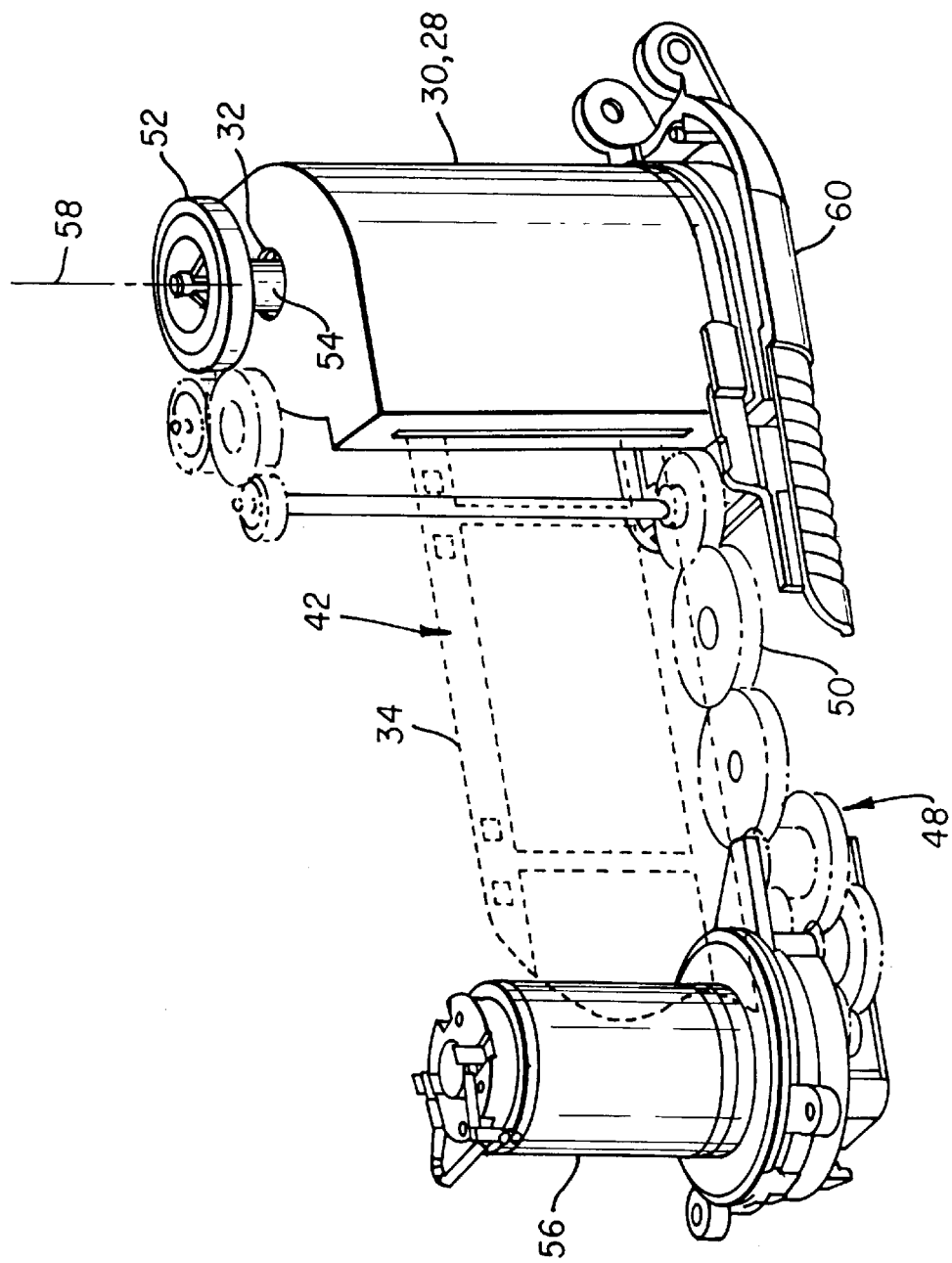
FIG. 11 is a semi-diagrammatical top rear view of the camera and of FIG. 1 deleting camera components, except for the film drive and film door. The cartridge is illustrated in the film cartridge chamber.
Figure 12:
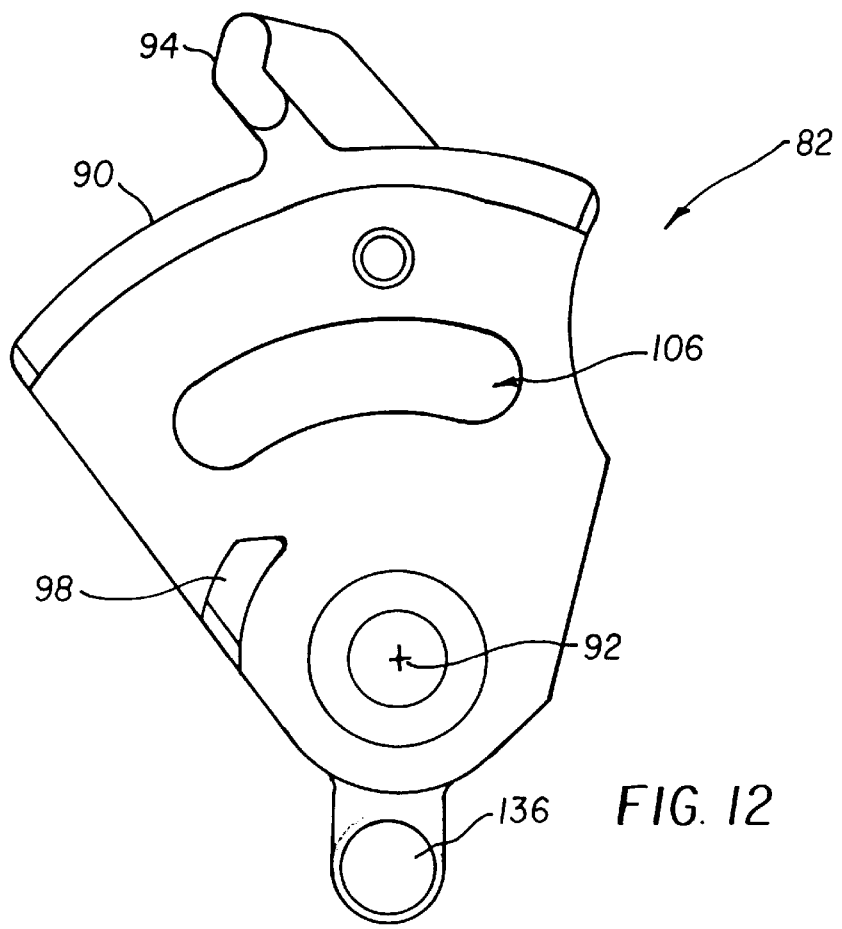
FIG. 12 is a top view of the pivot plate of the sector of the camera of FIG. 1.

Referring to FIG. 11, a film transport 48 is mounted in the body 12 to advance and rewind the filmstrip 34. The film transport 48 drives a spool 32 and is connected by a gear train 50 to a cartridge spool driver 52. The cartridge spool driver 52 includes a spindle 54 and is mounted in the body 12 such that the spindle 54 extends into the film cartridge chamber 24 and can engage the spool 32 of a film cartridge 28 loaded in the film cartridge chamber 24. Detailed features of the film transport 48 can vary. For example, although it is less convenient, the spindle 54 of the cartridge spool driver 52 could engage the outer end of the cartridge, rather than the inner end as shown in the figures. The spool driver 52 is driveable, by a motor 56 of the film transport 48, in two opposed directions of rotation about a spool driver axis 58, to rotate the spools 32 and advance and rewind the filmstrip 34.

A film door 60 is mounted to the camera body 12. The film door 60 is changeable between an access configuration and a non-access configuration. The film door 60 has a cover panel 62 that, in the non-access configuration occludes the opening of the film cartridge chamber 24. In the access configuration, a cover panel 62 of the film door 60 is rotated or slid or otherwise moved back from the opening 64 of the film cartridge chamber 24 and the film cartridge chamber 24 is accessible for loading and unloading of the film cartridge 28. In the non-access configuration, the cover panel 62 is closed over the opening 64 and the film cartridge chamber 24 is light-tight and inaccessible.

The film door 60 includes a tappet 66 that is movable between latched and unlatched positions. In moving between the latched and unlatched positions, the tappet 66 sweeps through a zone of travel 67 within the body 12. The tappet 66 is in the latched position when the film door 60 is in the non-access configuration. The tappet 66 can move in unison with the cover panel 62 or with a clasp 68 that moves relative to the cover panel 62 to change the film door 60 between non-access and access configurations.

Figure 5:
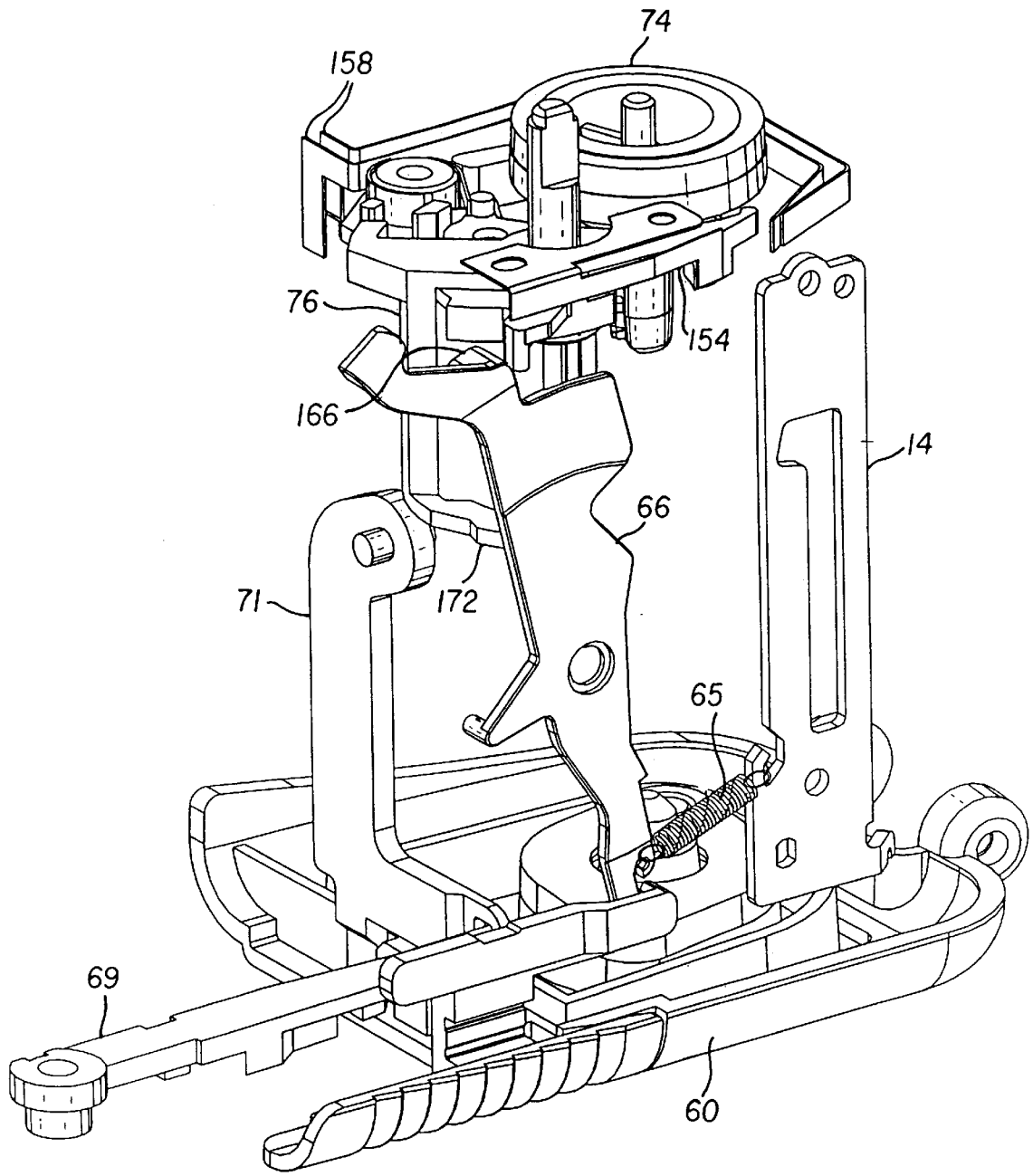
FIG. 5 is a top, rear perspective view of camera of FIG. 1, with the cartridge and all camera components deleted, except the film door restraint, film door, and some film door related components of the camera.
Figure 6:
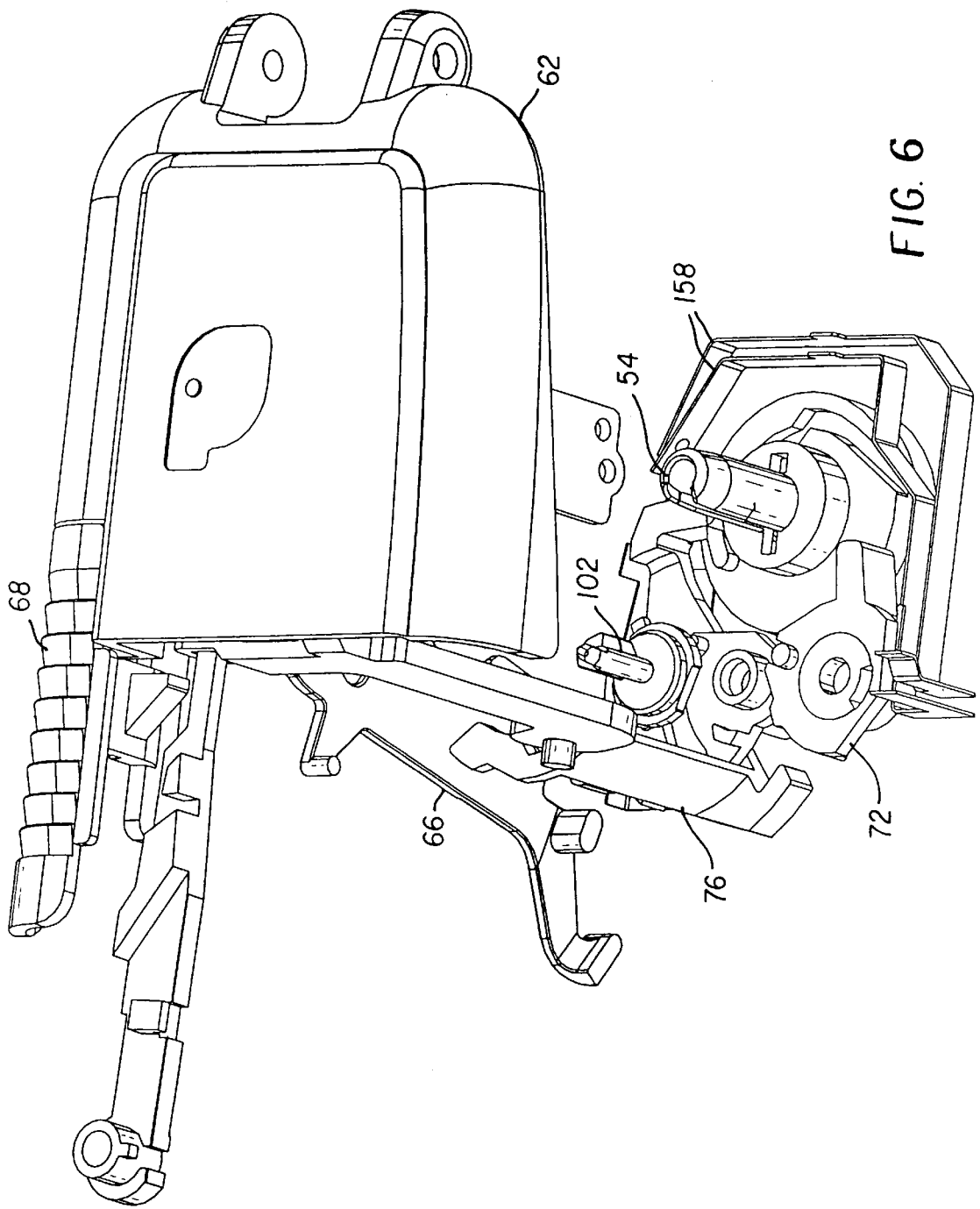
FIG. 6 is a rotation of the view of FIG. 5 to a bottom, front perspective.
Figure 7:
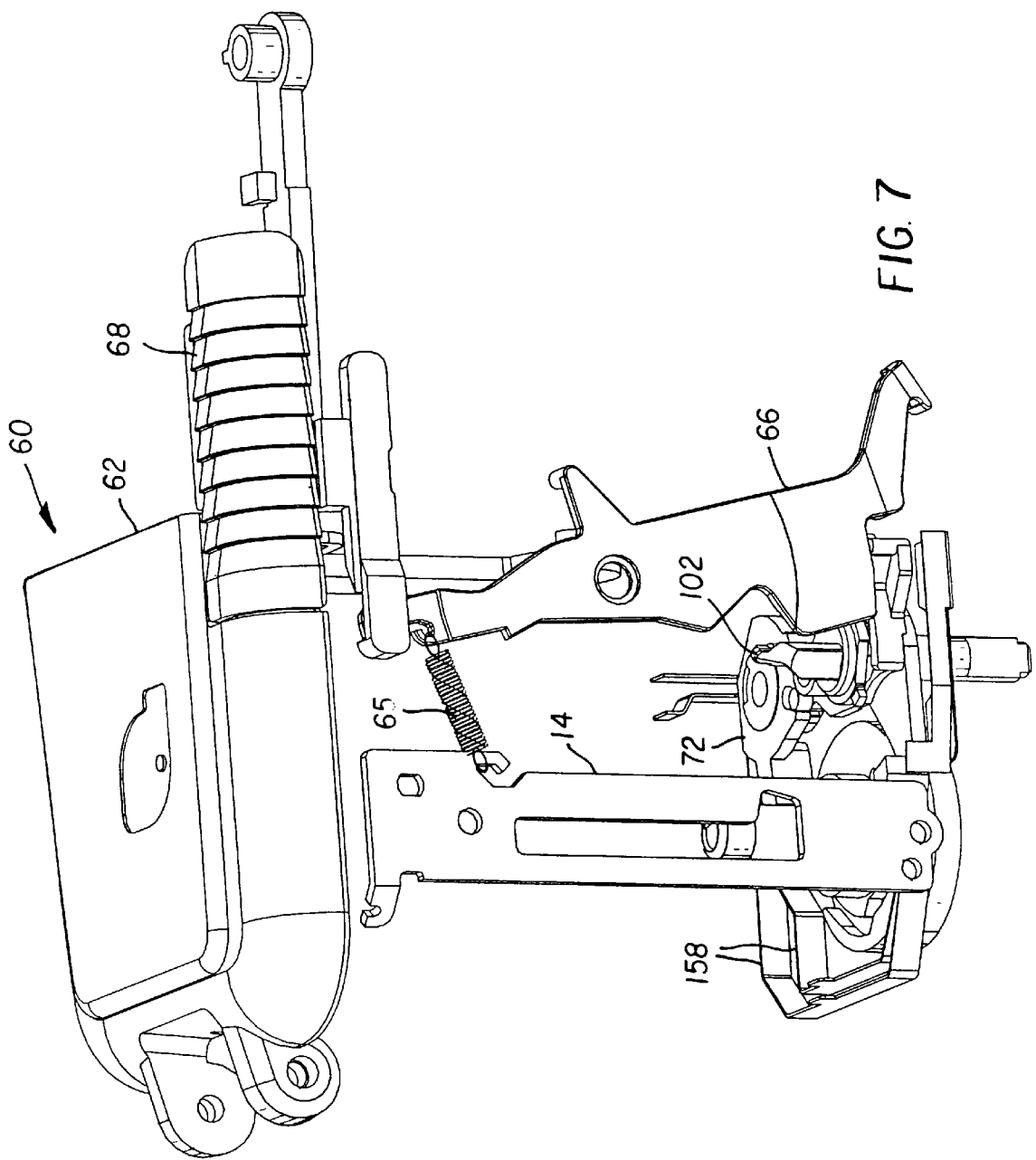
FIG. 7 is a rotation of the view of FIG. 6 to a bottom, rear perspective.
Figure 8:
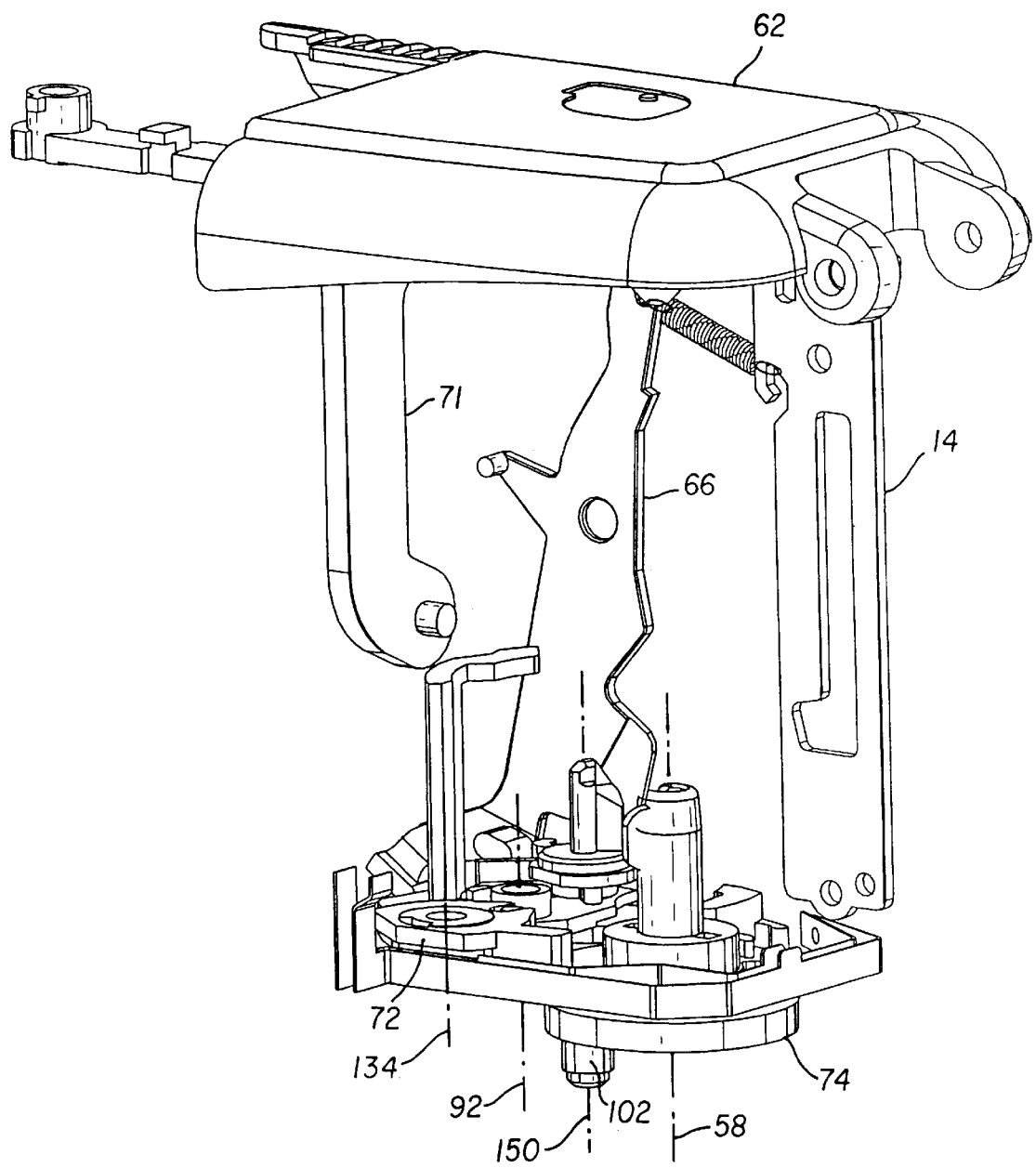
FIG. 8 is a rotation of the view of FIG. 6 to a centered, rear perspective.
Figure 9:
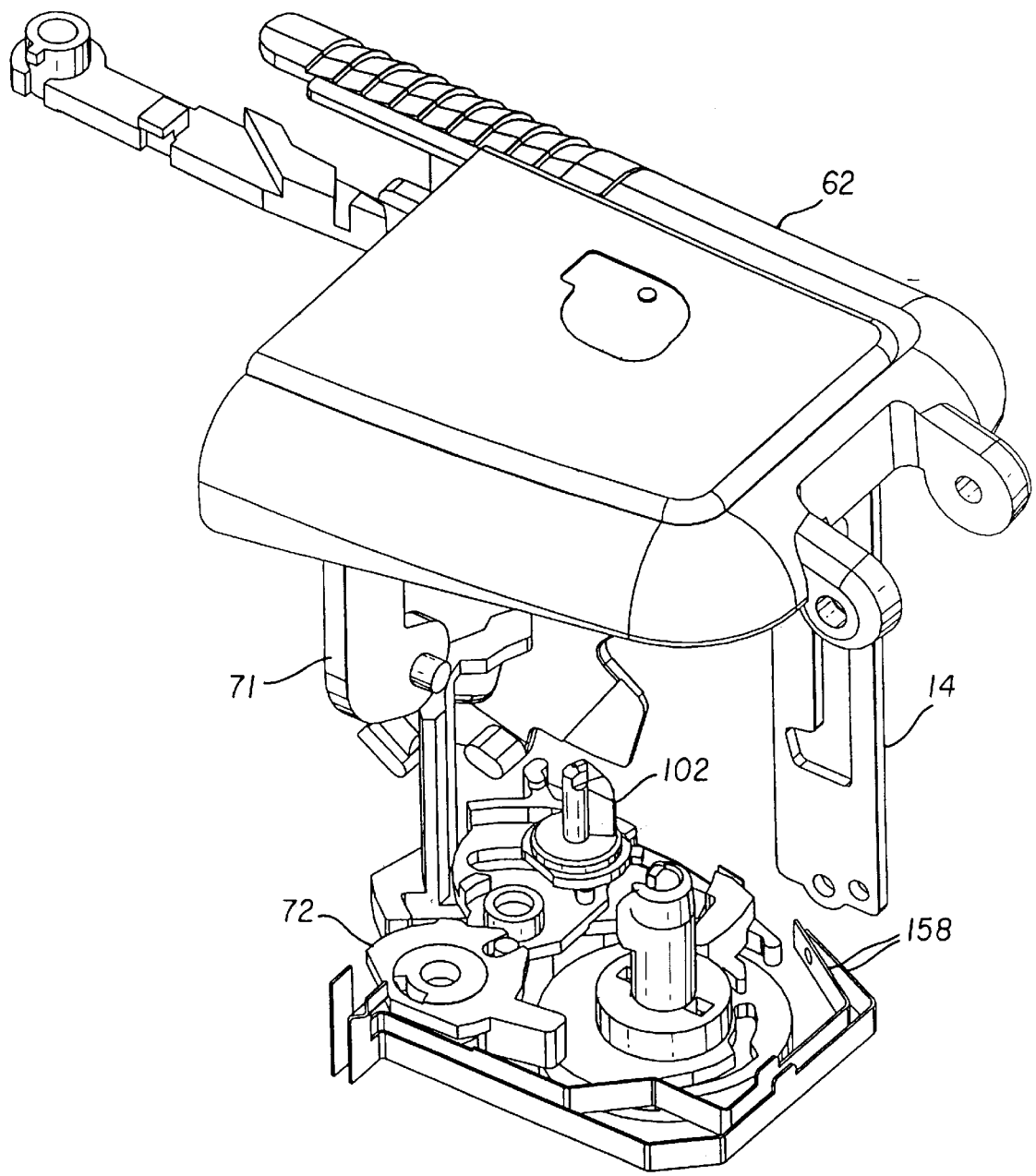
FIG. 9 is an endwise rotation of the view of FIG. 6.
Figure 10:
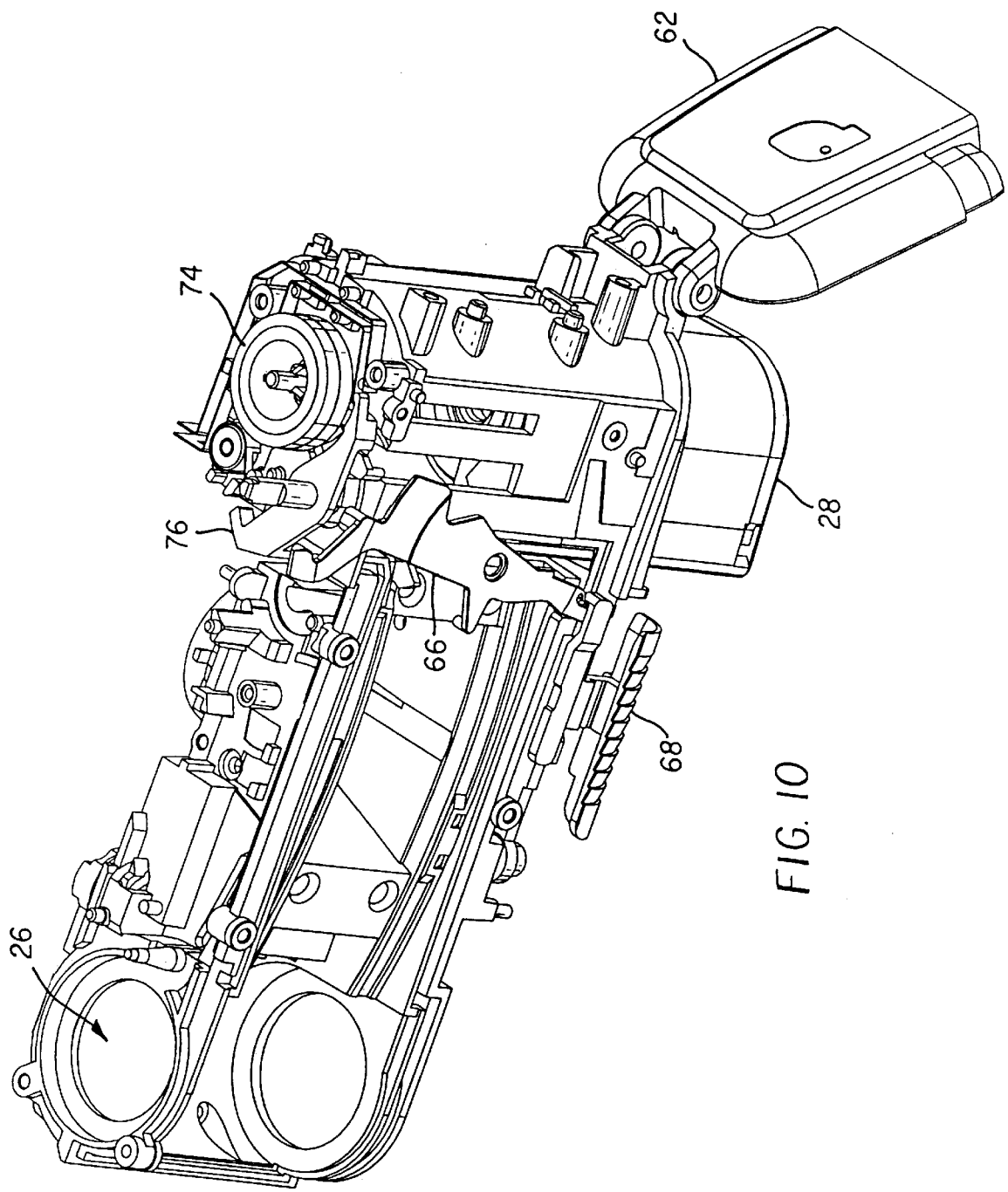
FIG. 10 is rotation of the view of FIG. 2 to a top, rear perspective.

In the embodiment of the invention shown in the figures, the tappet 66 is a lever biased by a spring 65 the film door 60 includes a clasp 68 that extends outside the camera body 12 and is movable with the tappet 66 between the latched and unlatched positions. Referring to FIG. 5, the clasp includes a detent lever 69 and a latching lever 71, which move in tandem with the clasp to release or secure the film door 60. The design of the film door 60 can be varied to meet the requirements of a particular camera body 12. The tappet 66, for example, can be a fixed protrusion extending inward from the cover panel 62 of the film door 60 or, as shown in the figures can be a separate pivotable member, or can include both.

The film door restraint 70 of the invention is included in the body 12. The film door restraint 70 includes a toggle 72, a rotational member 74, and a follower 76. The toggle 72 is coupled to the active light lock 36 and is capable of tripping between an open position, in which the active light lock 36 is open, and a closed position, in which the active light lock 36 is closed. The rotational member 74 is joined to the spool driver 52 and rotates with the spool driver 52. The rotational member 74 defines a primary guideway 78 and a secondary guideway 80. The follower 76 is mounted so as to follow the guideways 78,80 and transmit relative motion to the toggle 72.

The toggle 72 is articulated and includes a sector 82, a throw 84, a coupling 86, and a biasing spring 88. Referring now to FIGS. 12–17, the sector 82 includes a roughly leaf-shaped pivot plate 90 that is pivotably mounted to the camera frame 14 for pivoting about a sector axis 92. The pivot plate 90 of the sector 82 has a tab 94 that extends radially outward from the sector axis 92. The pivot plate 90 also has a sector pin 96 and a bumper 98 that protrude from the inner surface 100 of the pivot plate 90. The sector 82 also includes a connector 102 and connector receiver 104 that provide a union between the pivot plate 90 and the shank 38 of the active light lock 36. The connector receiver 104 includes an arcuate slot 106 that extends through the pivot plate 90. A portion of the frame 14 underlying the recess 108 includes and a cylindrical recess 108 and a partially cylindrical cavity 110. The cavity 110 is aligned with the recess 108. The cavity 110 includes a first limit surface 112 and a second limit surface 114.

Figure 13:
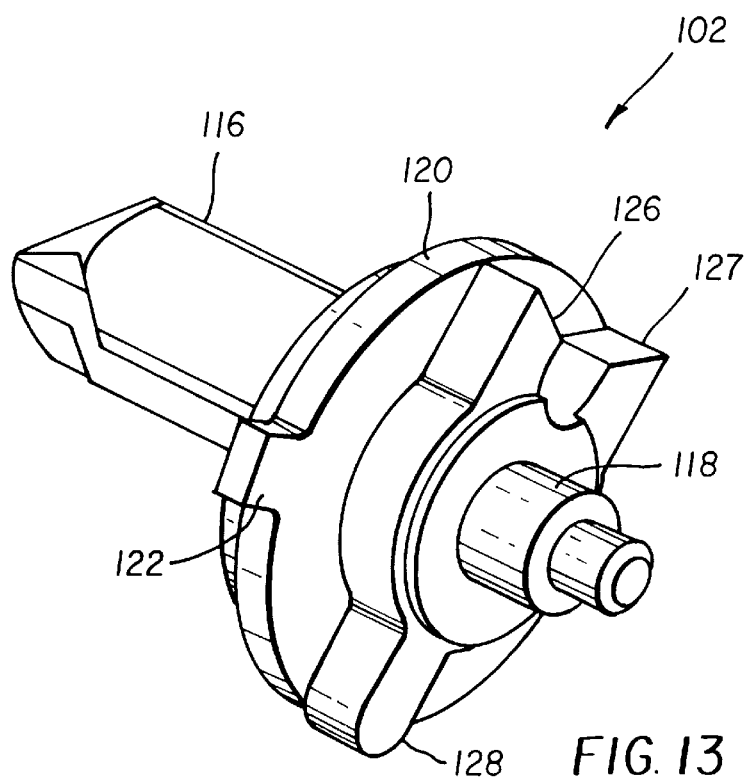
FIG. 13 is a top perspective view of the connector of the sector of the camera of FIG. 1.

As shown in FIG. 13, the connector 102 has a lead end 116 that engages the shank 38 of the active light lock 36. Axially opposite the lead end 116 is a cylindrical roller segment 118 that rides in the connector receiver 104. Between the roller segment 118 and the lead end 116, in an axial direction, is a roughly discoid bearing segment 120 that fits in the cavity 110. The bearing segment 120 includes an ear 122 that extends radially outward and is positioned so as to contact the limit surfaces 112,114 and prevent further rotation of the connector 102. Between the bearing segment 120 and the roller segment 118, in an axial direction, is a fork-shaped arm segment 124. The arm segment 124 fits in the recess 108 of the pivot plate 90. The arm segment 124 has a pair of generally parallel, radially extending pin arms 126,127; and, opposite the pin arms 126,127, a radially extending bumper arm 128.

Figure 14:
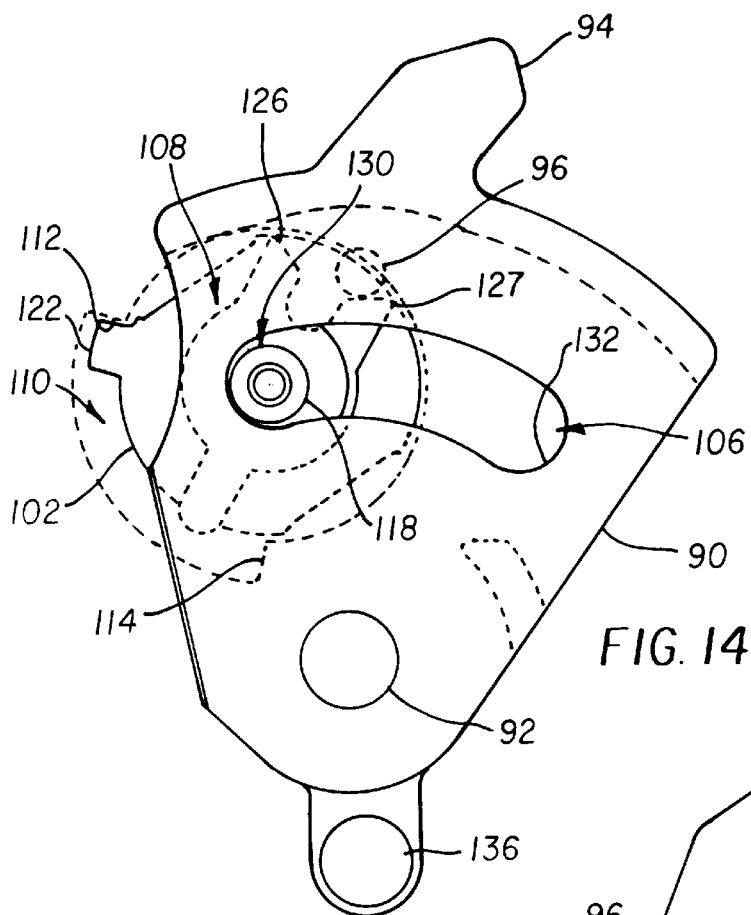
FIG. 14 is the same view as FIG. 12 showing the sector of the camera of FIG. 1 in an open position.
Figure 15:
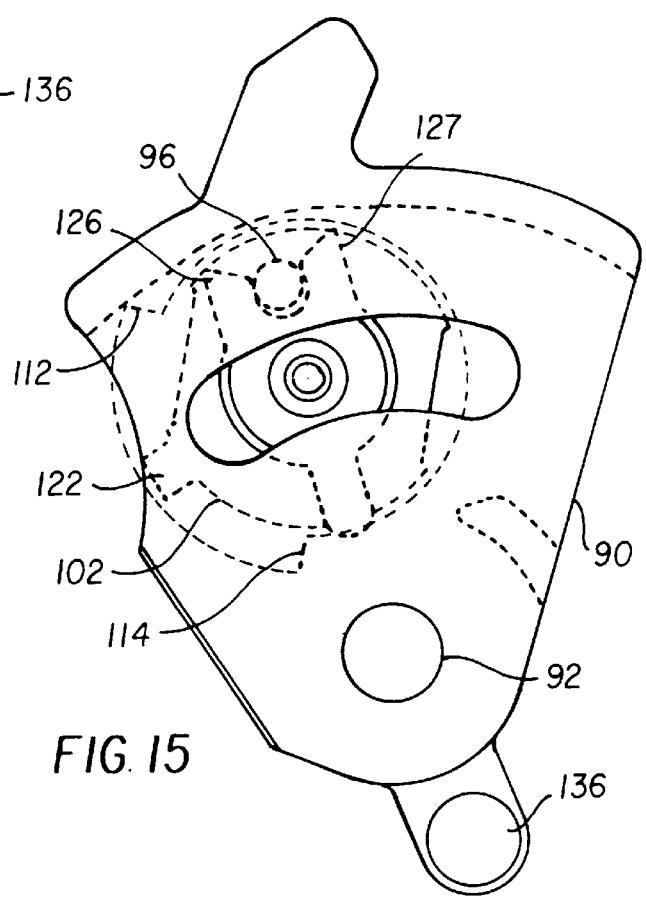
FIG. 15 is the same view as FIG. 14 and shows the sector in a first intermediate position.

FIG. 14 shows the sector 82 of the toggle 72 in the open position. In this position, the sector pin 96 is adjacent the second pin arm 127. The roller segment 118 engages a first end 130 of the connector receiver slot 106 and the ear 122 of the bearing segment 120 is adjacent to the first limit surface 112. As the toggle 72 is moved to the closed position, the sector 82 rotates counterclockwise (CCW) about the sector axis 92. This rotary motion brings sector pin 96 between the first and second pin arms 126,127, as shown in FIG. 15. Ear 122 is in between the limit surfaces 112,114. (FIG. 15 shows the sector 82 part way between the open and closed positions.) Further CCW rotation of the sector 82 causes the sector pin 96 to rotate the connector 102 in a CCW direction. The rotation of the connector 102 is at a faster rate than the rotation of the sector 82.

Figure 16:
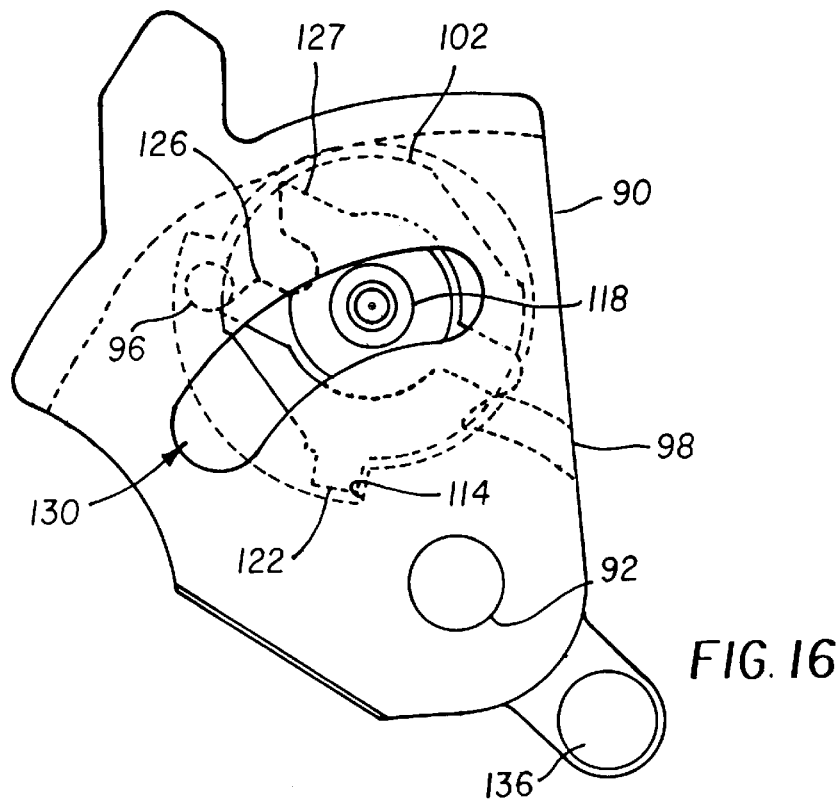
FIG. 16 is the same view as FIG. 14 and shows the sector in a second intermediate position.
Figure 17:
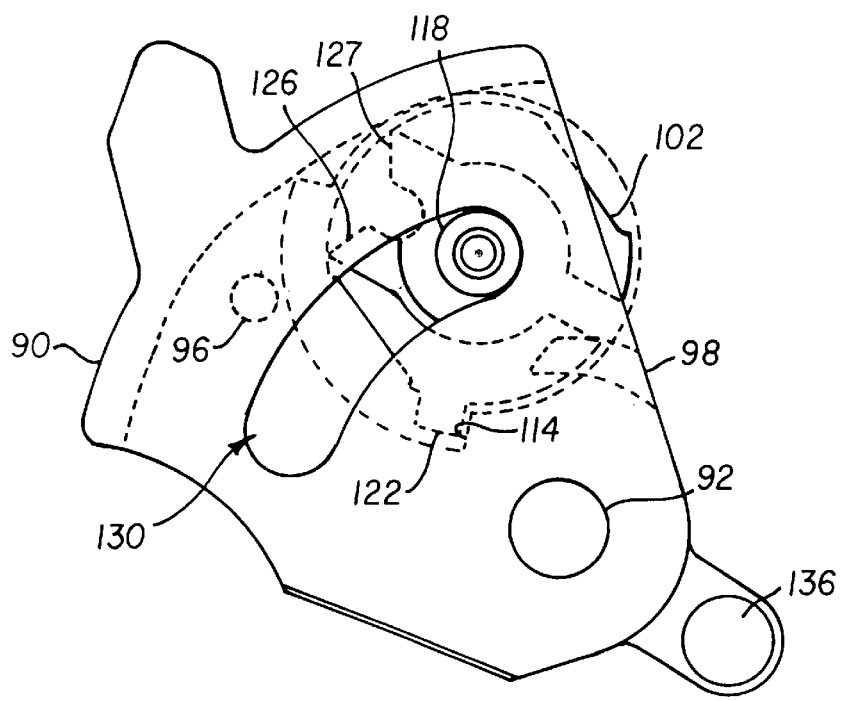
FIG. 17 is the same view as FIG. 14 and shows the sector in a closed position.

FIG. 16 shows the sector 82 after further CCW motion toward the closed position. The sector pin 96 is now from between the pin arms 126,127, the ear 122 is adjacent to the second limit surface 114, and the bumper arm 128 engages the bumper 98. At this point, the connector 102 can no longer rotate CCW because the ear 122 is against the second limit surface 114, and the connector 102 cannot rotate clockwise (CW) because the bumper arm 128 has engaged the bumper 98. This effectively locks the active light lock 36 in a closed position, rendering the film cartridge 28 light-tight. The sector 82 can still rotate CCW because the roller segment 118 has not yet engaged the second end of the connector receiver slot 106. FIG. 17 shows the sector 82 after the sector 82 has rotated fully CCW so that the roller segment 118 engages the second end 132 of the connector receiver slot 106, stopping further movement. This further rotation of the sector 82 after the active light lock 36 has stopped rotating provides a safety margin for closure of the active light lock 36 prior to opening the film door 60.

The throw 84 is roughly oblong or leaf-shaped and is mounted to the frame 14 of the camera 10 so as to be pivotable about a throw axis 134. The sector axis 92 and throw axis 134 are separated and are preferably parallel to each other and to the spool driver axis 58. The sector 82 and throw 84 are joined together by the coupling 86 such that both sector 82 and throw 84 freely pivot about their axes 92,134, in effect, converting the arcuate motion of the sector 82 and throw 84 to linear motion of the coupling 86. The sector 82 and the throw 84 pivot to either side relative to a line connecting the sector axis 92 and the throw axis 134, through roughly 15 to 25 degrees, for a total excursion of about 30 to 50 degrees. Further pivoting toward either side, is prevented by the union between the sector 82 and the active light lock 36.

Figure 18A:
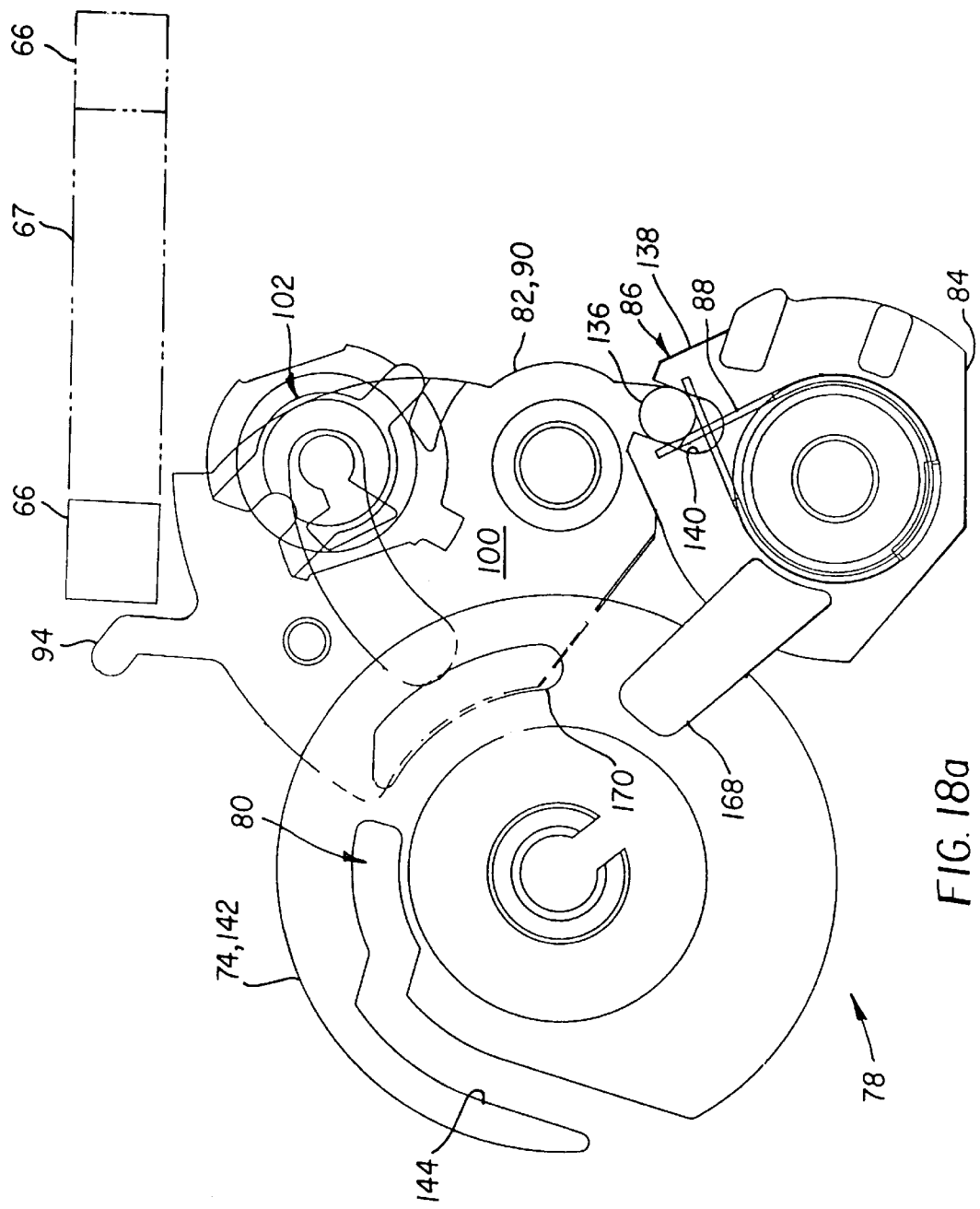
FIG. 18a is a simplified bottom perspective view of the toggle and rotational member of the camera of FIG. 1. The toggle is shown in the closed position. The location of the tappet, in the latched position, is indicated by a box.
Figure 18C:
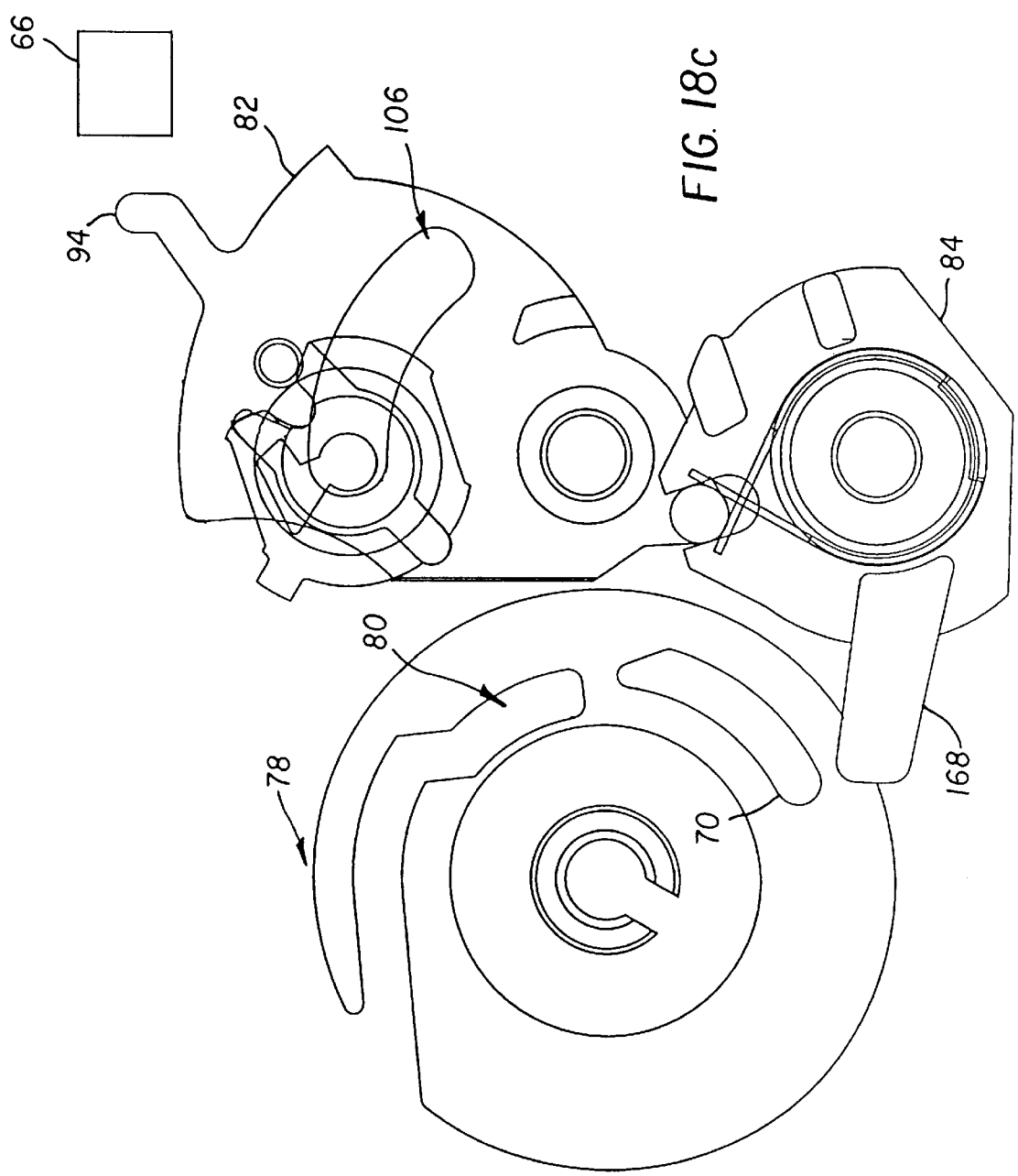
FIG. 18c is the same view as FIG. 18, but the toggle has tripped to the open position. The location of the tappet, in the unlatched position, is indicated by a box.
Figure 19C:
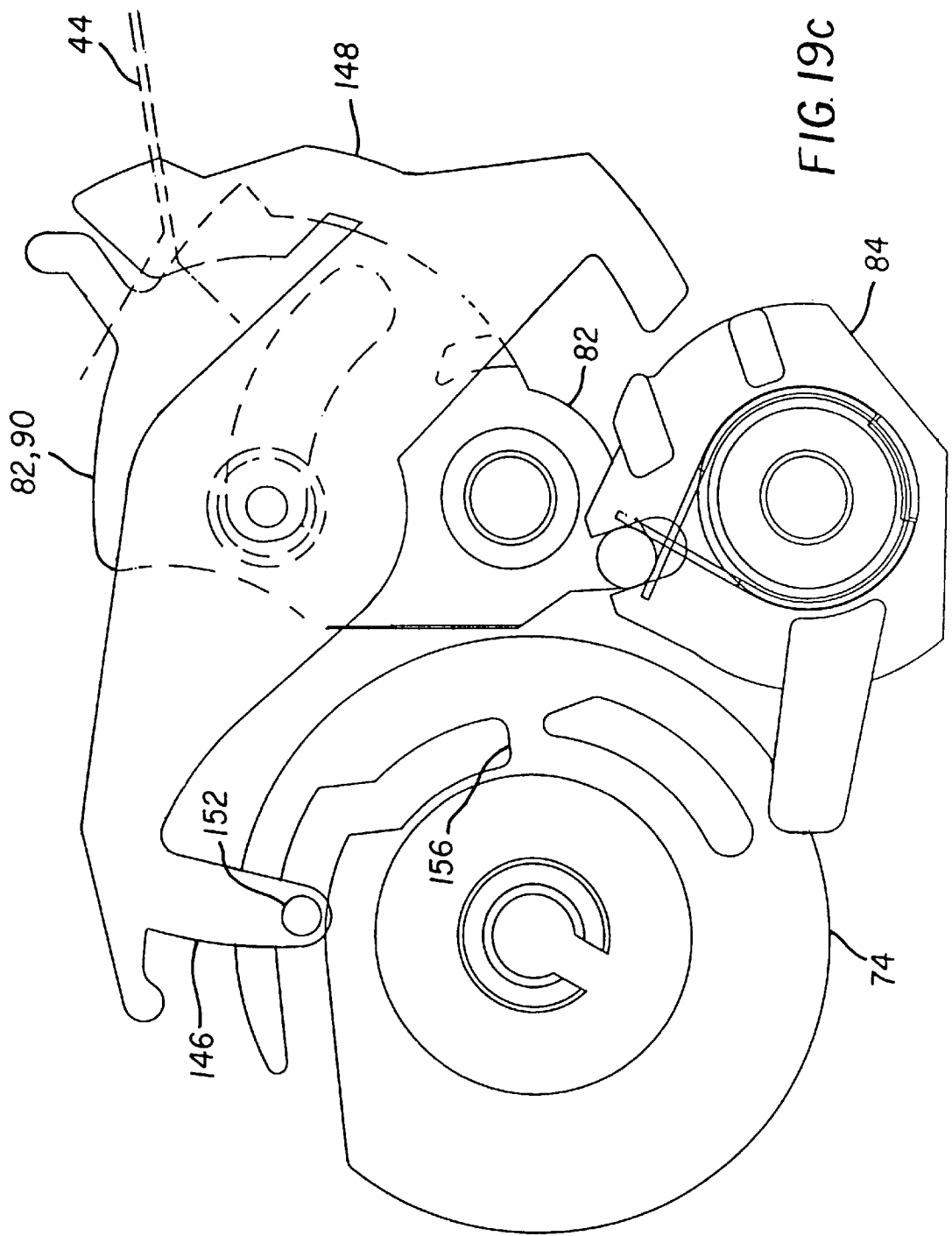

A convenient coupling 86 is shown in the figures. The coupling 86, which is spaced apart from both axes 92,134, includes a pin 136 fixed to the sector 82 and a slotted nose 138 fixed to the throw 84. In the embodiment shown, the nose 138 is integral with the remainder of the throw 84. The nose slot 140 has a major dimension extending substantially radial to the throw axis 134 and loosely receives the pin 136. As the sector 82 and throw 84 pivot together relative to their axes 92,134 and the body 12, the pin 136 moves up and down the slot 140 in directions radial to the throw axis 134. The biasing spring or resilient member 88 is positioned so as to push the sector 82 and throw 84 away from each other. In the embodiment shown in the figures, the biasing spring 88 urges the pin 136 radially outward from the throw axis 134 substantially along the longitudinal dimension of the slot 140. The effect of the biasing spring 88 on the coupled sector 82 and throw 84 is to render the sector 82 and throw 84 bistable, with stable positions at maximum excursion of the sector 82 and throw 84 to each side and an unstable position in the middle. In FIG. 18c, the toggle 72 is pivoted to the left side and is in the stable closed position. In FIG. 18a, the toggle 72 is pivoted to the right side and is in the stable open position.

The rotational member 74 and follower 76 in the embodiment of the invention shown in the figures are a cam and cam follower, respectively; but other structures providing equivalent mechanical movements could also be used. The rotational member 74 is fixed to the spool 32 drive and has the shape of a deformed disk having an outer margin 142 and a throat 144 branching inward from the outer margin 142.

The follower 76 has opposed first and second ends 146,148 and a center that is pivotably mounted to the connector 102 in axial alignment with a connector axis 150 extending through the connector 102. The connector axis 150 is preferably parallel to the other axes 92,134. The first end 146 of the follower 76 has a tip 152 that is in radial alignment with the spool driver axis 58. The tip 152 can include a rotary member or other friction reducer. Pivoting of the follower 76 about the connector axis 150 causes the tip 152 to move in a substantially radial direction toward or away from the spool driver axis 58. The follower 76 is biased by a biasing member 154 toward the spool driver axis 58.

The primary guideway 78 is defined by the outer margin 142 of the rotational member 74 and part of the throat 144 adjoining the gap 155 in the outer margin 142. During rotation of the rotational member 74 in the first direction of rotation, the tip 152 of the first end 146 of the follower 76 remains in the primary guideway 78. The tip 152 travels along the outer margin 142 until the throat 144 is reached. The tip 152 then skips into the throat 144, and travels back out of the throat 144 to the outer margin 142. The tip 152 is excluded from travelling down the throat 144 into the secondary guideway 80 by the angle at which the throat 144 extends inward from the outer margin 142. The tip 152 travels along the primary guideway 78 indefinitely as long as the rotational member 74 continues to be rotated in the first direction of rotation. As discussed below, in one situation, the tip 152 can also travel within the primary guideway 78; following, but spaced apart from the rotational member 74.

During rotation of the rotational member 74 in the second direction of rotation, the tip 152 travels along the outer margin 142 until the throat 144 is reached and then enters the throat 144, under the urging of the biasing member 154, and continues in contact with the rotational member 74 until reaching the blind end 156 of the secondary guideway 80. Further progress of the tip 152 is not possible, nor is further rotation of the rotational member 74 in the second direction. The motor 56 of the film transport can be stopped by stalling until an electrical circuit (not illustrated) responds and cuts power. Alternatively, referring to FIGS. 20a–20f, a motor kill switch 158 can be provided. The switch 158 is mounted in the body 12 such that a portion of the throat 144 is inclined relative to the switch 158, whereby a limb 160 of the follower 76 can actuate the switch 158 when the tip 152 of the first end 146 travels into the secondary guideway 80. The inclination can be adjusted to meet the requirements of a particular switch 158. In a particular embodiment of the invention, the switch 158 is normally closed and is in a circuit (not shown) for actuating the motor 56 when the spool driver 52 is driven in the second direction of rotation.

Figure 20B:
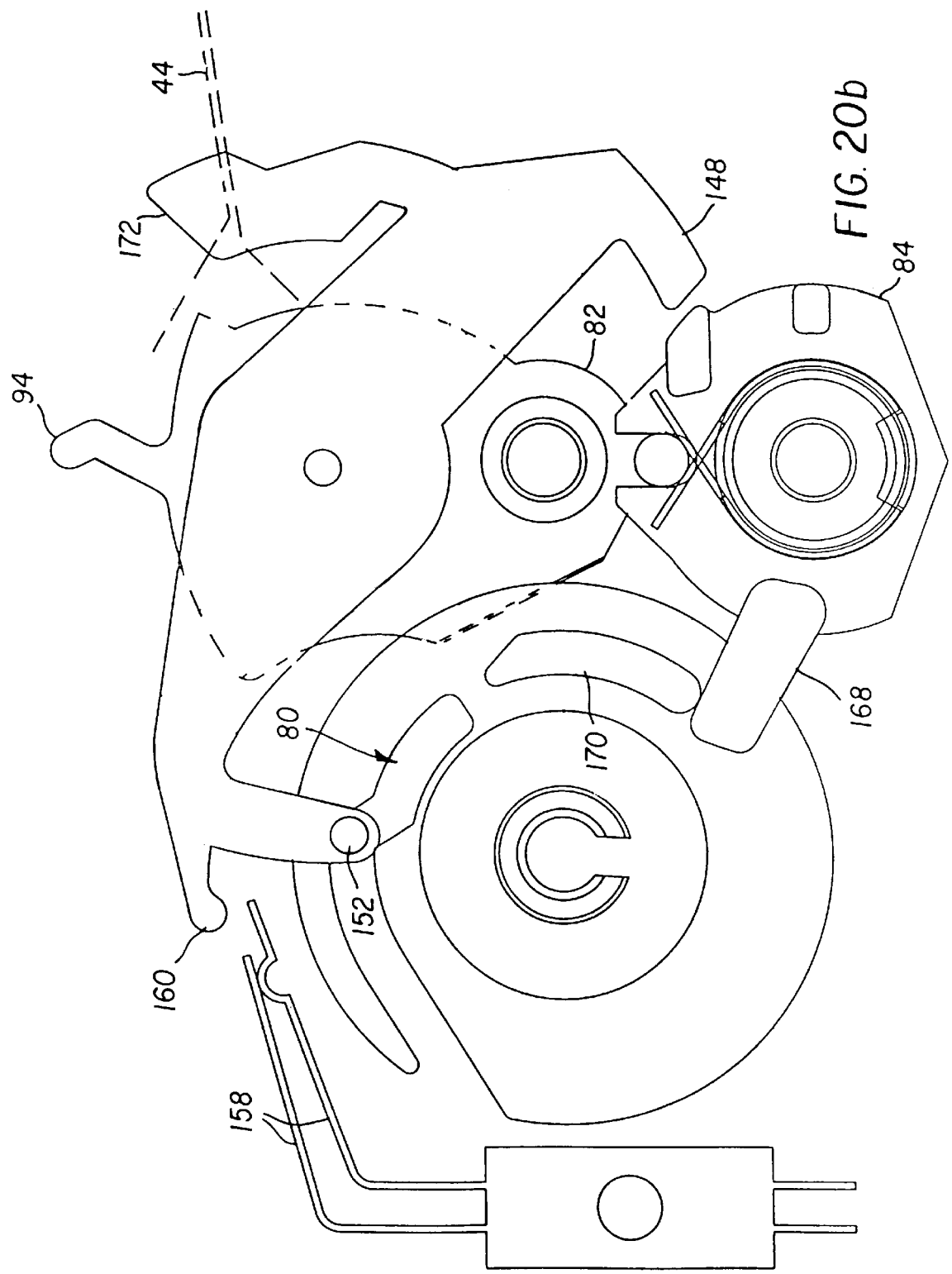
Figure 20C:
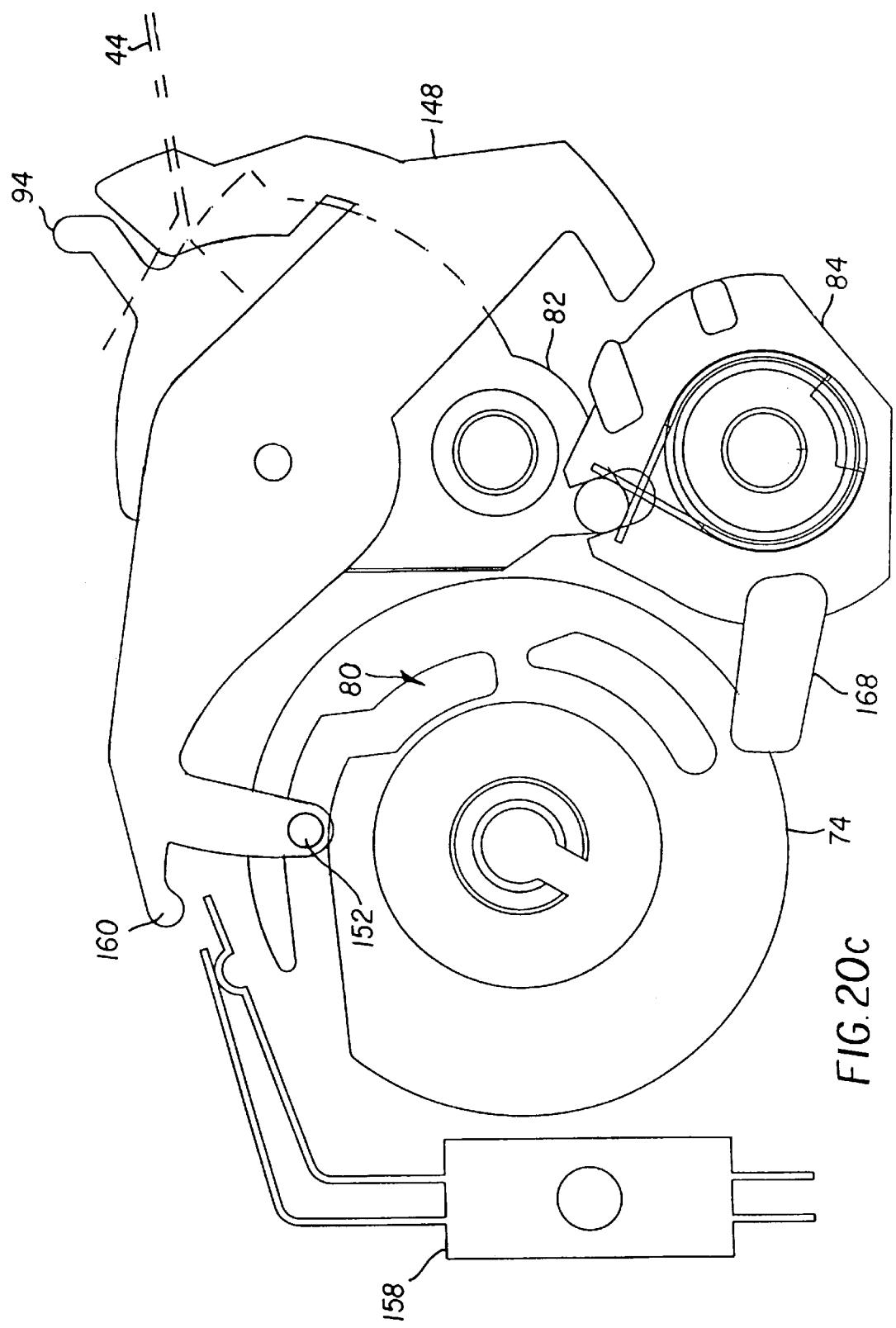
Figure 20D:
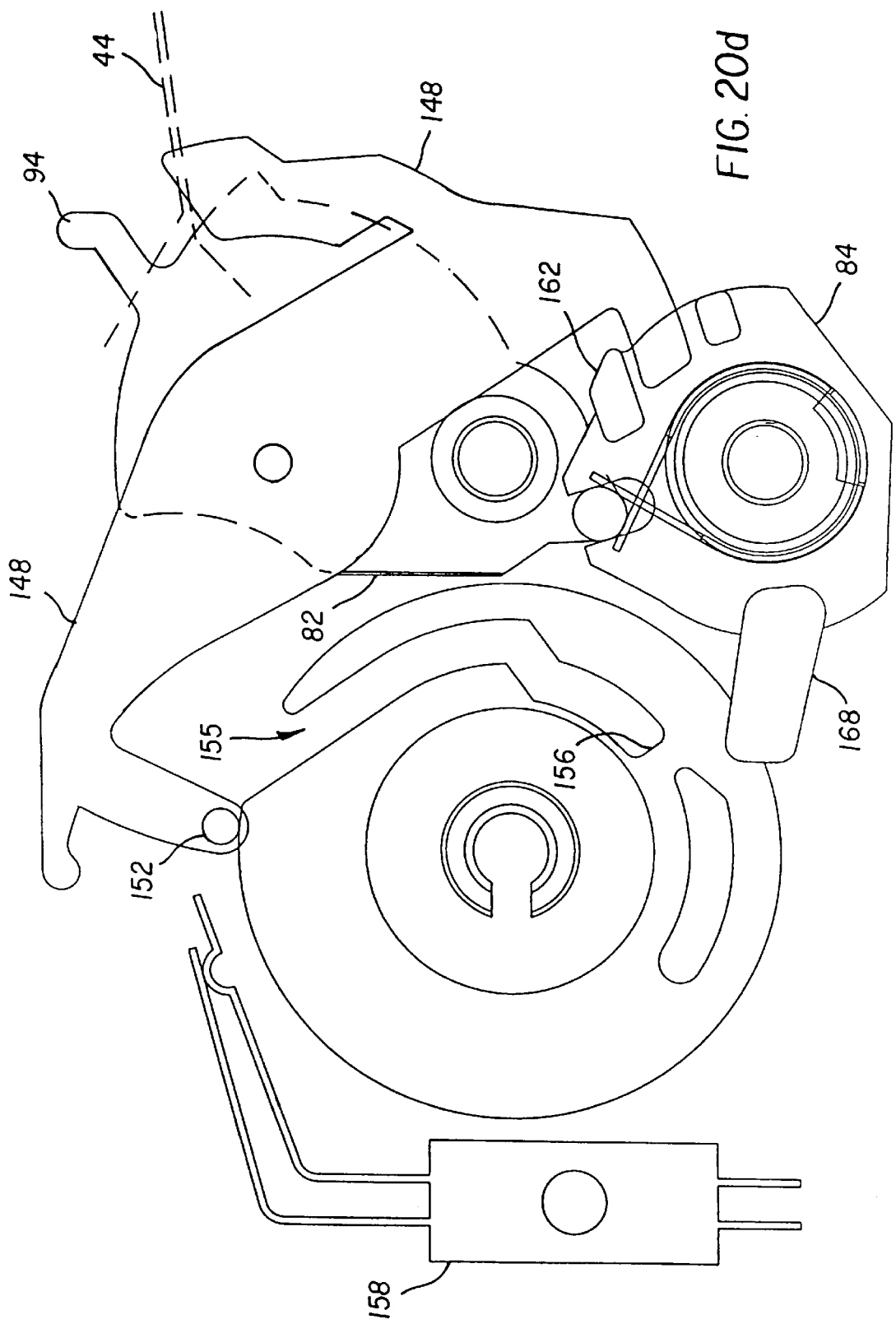
Figure 20E:
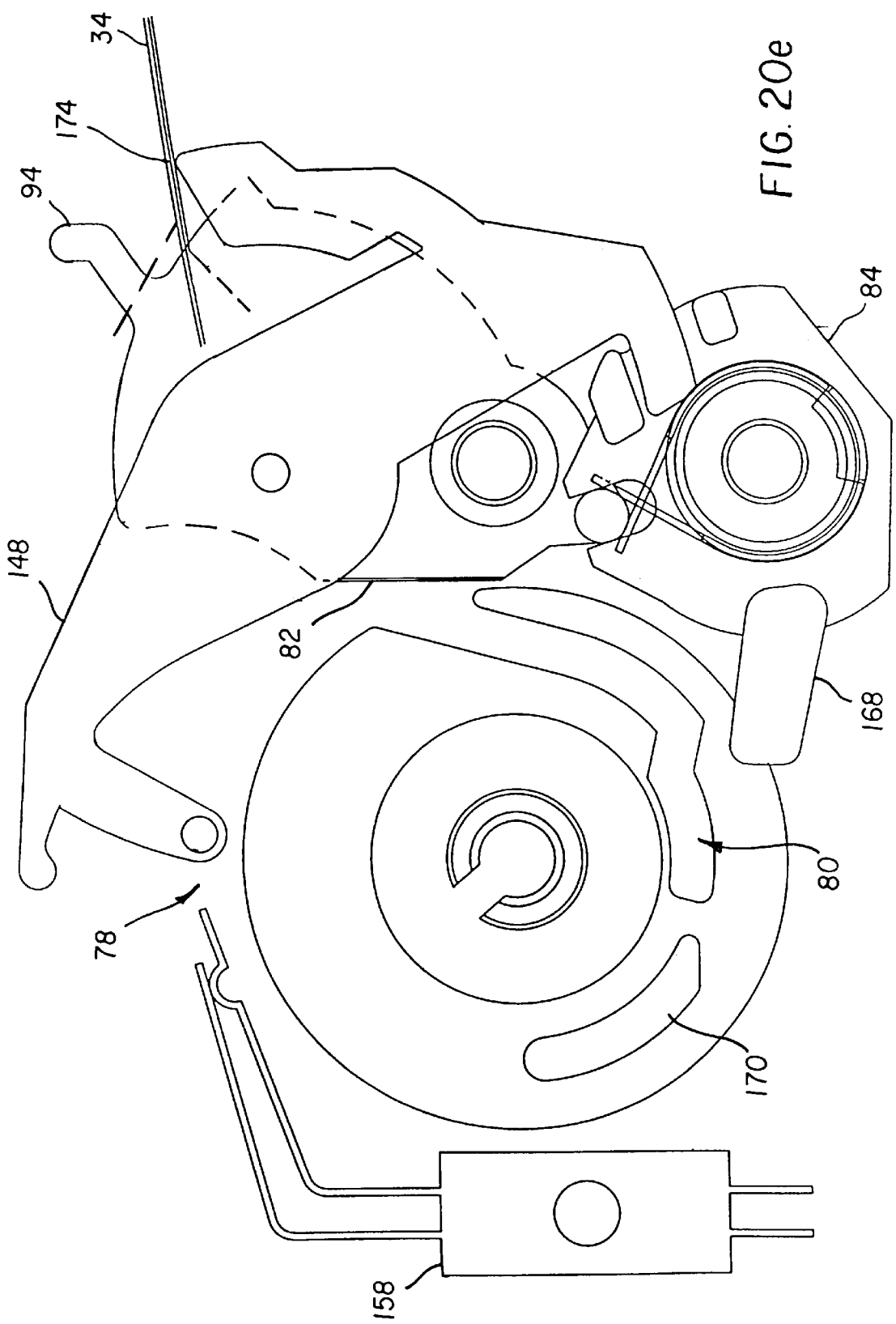
Figure 20F:
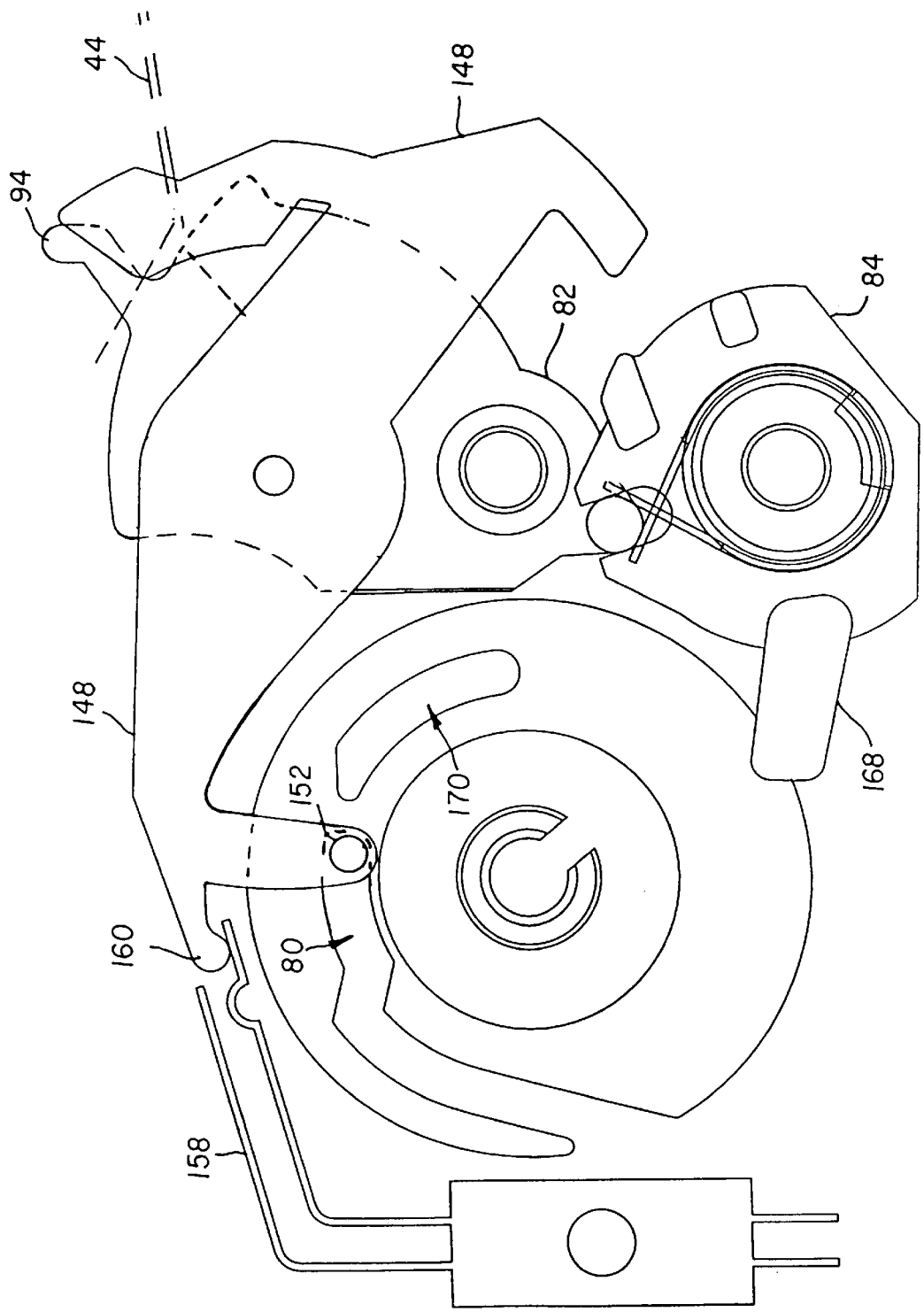

FIGS. 20a–20f illustrates the actuation and deactuation of the motor kill switch 158. In FIG. 20a, the first end 146 of the follower 76 is in the secondary guideway 80, the toggle 72 is in the closed position, and the switch 158 is deactuated. The motor 56 rotates the rotational member 74 in the first direction and the follower 76 pivots actuating the switch 158, as shown in FIG. 20b. Rotation continues as shown in FIGS. 20c and 20d; and, as shown in FIG. 20e, the filmstrip 34 is advanced through the film gate 46. For rewinding, the motor 56 is switched to rotate the rotational member 74 in the second direction of rotation, the first end 146 of the follower 76 enters the secondary guideway 80 opening the switch 158 and killing the motor 56, as shown in FIG. 20f. The toggle 72 is in the open position and can be moved into the closed position by the user.

The second end 148 of the follower 76 moves toward and away from the throw 84 when the follower 76 pivots. When the first end 146 of the follower 76 is in the secondary guideway 80, the second end 148 is pivoted away from the throw 84 and the toggle 72 is free to trip between the open and closed positions. When the first end 146 of the follower 76 is in the primary guideway 78, the second end 148 traps the toggle 72 in the open position. In the embodiment shown in the figures, the trapping of the toggle 72 is provided by a stop 162 that is fixed to the throw 84 and is positioned to engage the second end 148 of the follower 76 when the user attempts to move the tappet 66 to the unlatched position. The toggle 72 does not move or moves slightly then returns to the open position under the urging of the biasing spring 88. A second stop 164 can optionally be provided on the throw 84 to limit motion of the tappet 66, if the user tries to "rock" the tappet 66 back and forth.

When the toggle 72 is in the open position, the tab 94 that extends outward from the sector 82, is disposed in the zone of travel 67 of the tappet 66. This causes the toggle 72 to be tripped from the open position to the closed position when the tappet 66 is moved from the latched position to the unlatched position. The tappet 66 and toggle 72 can be designed such that the tappet 66 also trips the toggle 72 from the closed to the open position when the tappet 66 moves from the unlatched position to the latched position. This is not preferred, however, since the movement of the tappet 66 is provided manually by the operator and the use of excessive force or wear or damage to the film door 60 causing misalignment would present a risk of inappropriate opening of the active light lock 36 and light damage to the film. The figures illustrate the preferred embodiment in which the tappet 66 has a protrusion 166 that is positioned so as to contact the tab 94 of the sector 82 only when the tappet 66 is moved from the latched position to the unlatched position. In this embodiment, the tappet 66 cannot trip the toggle 72 from the closed position to the open position; but the rotational member 74 can. The throw 84 includes a lever arm 168 that extends outward toward the rotational member 74 and the rotational member 74 includes a lug 170 that extends axially outward from the rest of the rotational member 74. The lug 170 is positioned so as to contact the lever arm 168 when the first end 146 of the follower 76 is in the secondary guideway 80, the toggle 72 is in the open position, and the rotational member 74 is initially rotated in the first direction. Upon contact with the lug 170, the toggle 72 is tripped from the closed position to the open position A sensor 172 is provided in the body 12 to detect when the filmstrip 34 extends outward from the cartridge, into the film path 42. When the filmstrip 34 is detected, the film sensor 172 prevents the follower 76 from traveling into the secondary guideway 80. In the embodiment shown in the figures, the film sensor 172 is a tang that is fixed to the follower 76 and extends radially and axially outward, relative to the connector axis 150. The tang 172 interrupts part of the film path 42 defined by the cartridge, the entry path 174, when the first end 146 of the follower 76 is in the secondary guideway 80. When the filmstrip 34 extends into the film path 42, the filmstrip 34 pivots the follower 76, displacing the tang 172 away from the film path 42, against the urging of the biasing member 154. The pivoting of follower 76 also maintains the first end 146 of the follower 76 in the primary guideway 78 as long as the tang 172 is in contact with the filmstrip 34. This keeps the tip 152 of the first end 130 from traveling down the throat 144 toward the secondary guideway 80 until the film has left the gate 46. As mentioned above, in a particular embodiment of the invention, the tang 172 is sized such that the first end 146 of the follower 76 remains in the primary guideway 78, but is pivoted away from the rotational member 74. This reduces friction and wear.

The invention has been described in detail with particular reference to certain preferred embodiments thereof, but it will be understood that variations and modifications can be effected within the spirit and scope of the invention.

camera 10
body 12
frame 14
shell 16
exposure system 18
viewfinder 20
battery compartment door 22
cartridge chamber 24
take-up chamber 26
film cartridge 28
canister 30
spool 32
filmstrip 34
active light lock 36
shank 38
intermediate section 40
film path 42
exposure frame 44
film gate 46
film transport 48
gear train 50
cartridge spool driver 52
spindle 54
motor 56
spool driver axis 58
film door 60
cover panel 62
opening 64
spring 65
tappet 66
zone of travel 67
clasp 68
detent lever 69
film door restraint 70
latching lever 71
toggle 72
rotational member 74
follower 76
primary guideway 78
secondary guideway 80
sector 82
throw 84
coupling 86
biasing spring 88
pivot plate 90
sector axis 92
tab 94
sector pin 96
bumper 98
inner surface 100
connector 102
connector receiver 104
slot 106
recess 108
cavity 110
first limit surface 112
second limit surface 114
lead end 116
roller segment 118
bearing segment 120
ear 122
arm segment 124
pin arms 126,127
bumper arm 128
first end 130
second end 132
throw axis 134
pin 136
nose 138
slot 140
outer margin 142
throat 144
first and second ends 146,148
connector axis 150
tip 152
biasing member 154
gap 155
blind end 156
switch 158
limb 160
stop 162
stop 164
protrusion 166
lever arm 168
lug 170
sensor 172
entry path 174

What is claimed is:

1. A film door restraint, for use with a film door having a tappet movable between a latched position and an unlatched position, a film cartridge having a filmstrip and an active light lock movable between an open state and a closed state, and a cartridge spool driver movable in first and second directions of rotation to rotate a spool of said cartridge, said film door restraint comprising:

a toggle coupled to said active light lock, said toggle being capable of tripping between an open position, wherein said active light lock is open, and a closed position, wherein said active light lock is closed, said toggle being tripped by said tappet when said toggle is in said open position and said tappet is moved from said latched position to said unlatched position;

a rotational member joined to said spool driver for rotation with said spool driver, said rotational member defining a primary guideway and a secondary guideway;

a follower having first and second ends, said first end being disposed to travel along said guideways during said rotation, said second end trapping said toggle in said open position when said first end is disposed in said primary guideway, said second end freeing said toggle to trip when said first end is disposed in said secondary guideway.

2. The film door restraint of claim 1 wherein said first end is excluded from said secondary guideway when said first end travels in said primary guideway and said rotation in said first direction.

3. The film door restraint of claim 1 wherein said first end is excluded from said secondary guideway when said first end travels in said primary guideway and said rotation in said first direction, and said first end is biased toward passage from said primary guideway into said secondary guideway during said rotation in said second direction.

4. The film door restraint of claim 1 wherein said toggle is articulated.

5. The film door restraint of claim 1 wherein said follower frees said toggle to trip between said open and closed positions when said first end is disposed in said secondary guideway.

6. The film door restraint of claim 1 wherein said rotational member has a lug and said toggle has a lever arm, said lug being disposed to contact said lever arm and trip said toggle from said closed position to said open position when said toggle is in said closed position and said rotational member rotates in said first direction of rotation.

7. The film door restraint of claim 6 wherein said toggle is tripped by said tappet only when said toggle is in said open position and said tappet is moved from said latched position to said unlatched position.

8. The film door restraint of claim 1 wherein said film cartridge defines an entry path for said filmstrip, said second end includes a tang, and said follower is biased toward an unlocked orientation wherein said tang interrupts said film path and said first end is disposed in said secondary guideway, said tang being displaceable from said film path by said filmstrip to reorient said follower into a locked orientation wherein said first end is disposed in said primary guideway.

9. A camera, for use with a film cartridge having a filmstrip, a spool, and an active light lock movable between an open state and a closed state, said camera comprising:

a body defining a film cartridge chamber;

a cartridge spool driver mounted to said body in operative relation to said chamber; said spool driver being driveable in first and second directions of rotation to rotate said spool;

a film door mounted to said body, said film door having a tappet, said film door being changeable between an access configuration, wherein said chamber is accessible for loading and unloading of said film cartridge and said tappet is disposed in an unlatched position, and a non-access configuration, wherein said chamber is light-tight and said tappet is disposed in a latched position; and the film door restraint of claim 1.

10. A camera, for use with a film cartridge having a filmstrip, a spool, and an active light lock movable between an open state and a closed state, said camera comprising:

a body defining a film cartridge chamber;

a cartridge spool driver mounted to said body in operative relation to said chamber, said spool driver being driveable in first and second directions of rotation to rotate said spool;

a door for said chamber, said door having a tappet movable between a latched position and an unlatched position;

a toggle coupled to said active light lock, said toggle being capable of tripping between an open position, wherein said active light lock is open, and a closed position, wherein said active light lock is closed, said toggle being tripped by said tappet when said toggle is in said open position and said tappet is moved from said latched position to said unlatched position;

a rotational member joined to said spool driver for rotation with said spool driver, said rotational member defining primary and secondary guideways;

a follower having first and second ends, said first end being disposed to travel in said guideways during said rotation, said first end being excluded from said secondary guideway when said first end travels in said primary guideway and said rotation in said first direction, said first end being biased toward passage from said primary guideway into said secondary guideway during said rotation in said second direction, said second end trapping said toggle in said open position when said first end is disposed in said primary guideway, said second end freeing said toggle to trip when said first end is disposed in said secondary guideway.

11. The camera of claim 10 wherein said toggle is articulated.

12. The camera of claim 11 wherein said toggle includes a sector pivotable about a sector axis relative to said body and a throw pivotable about a throw axis relative to said body, and a coupling joining said sector and said throw, said coupling being spaced apart from said axes.

13. The camera of claim 12 wherein said coupling includes a pin joined to one of said sector and said throw and a nose joined to the other of said sector and said throw, said nose having a slot loosely receiving said pin.

14. The camera of claim 13 wherein said slot has a major dimension extending substantially radial to said throw axis and said toggle includes a resilient member biasing said pin radially outward from said throw axis along said major dimension.

15. The camera of claim 12 wherein said sector is coupled to said active light lock.

16. The camera of claim 10 wherein said rotational member is a cam and said secondary guideway is blind and branches from said primary guideway.

17. The camera of claim 10 wherein said follower is pivotable and said first end is biased toward said rotational member.

18. The camera of claim 10 further comprising a clasp extending outside said camera body, said clasp being movable with said tappet between said latched and unlatched positions.

19. The camera of claim 10 wherein said body defines a film path and said camera further comprises a film sensor adapted to detect the presence of a filmstrip in said film path, said film sensor preventing said follower from traveling along said secondary guideway when said film sensor detects said filmstrip.

20. The camera of claim 19 wherein said film sensor is a tang joined to said follower, said tang interrupting said film path when said follower is on said secondary guideway, said tang being displaceable from said film path by said filmstrip, said first end being spaced apart from said secondary guideway when said tang is displaced from said filmstrip.

21. The camera of claim 20 wherein said follower is separated from said rotational member when said filmstrip contacts said tang.

22. The camera of claim 10 wherein said rotational member has a lug and said toggle has a lever arm, said lug being disposed to contact said lever arm and drive said toggle from said closed position to said open position when said toggle is in said closed position and said spool driver is driven in said first direction of rotation.

23. The camera of claim 10 wherein said camera further comprises a switch mounted in said camera and said follower has an tab disposed to actuate said switch when said first end of said follower travels to said secondary guideway.

24. The camera of claim 23 further comprising a motor driving said spool driver and wherein said switch is normally closed and is in a circuit for actuating said motor in said second direction of rotation.

\* \* \* \* \*